US012330334B2

(12) United States Patent
Hart et al.

(10) Patent No.: US 12,330,334 B2
(45) Date of Patent: Jun. 17, 2025

(54) ADJUSTABLE CONCRETE FORM

(71) Applicant: RWH CONSTRUCTIONS SERVICES CO., Tampa, FL (US)

(72) Inventors: Randy Hart, Tampa, FL (US); Joan Lastra, Tampa, FL (US); Lance Keller, Tampa, FL (US); Robert Portugues, Tampa, FL (US); Torey Keller, Tampa, FL (US)

(73) Assignee: RWH CONSTRUCTIONS SERVICES CO., Tampa, FL (US)

( * ) Notice: Subject to any disclaimer, the term of this patent is extended or adjusted under 35 U.S.C. 154(b) by 252 days.

(21) Appl. No.: 17/956,321

(22) Filed: Sep. 29, 2022

(65) Prior Publication Data

US 2024/0109222 A1 Apr. 4, 2024

(51) Int. Cl.

| | |
|---|---|
| ***B28B 7/20*** | (2006.01) |
| ***B28B 7/00*** | (2006.01) |
| ***B28B 7/02*** | (2006.01) |
| ***E04G 9/08*** | (2006.01) |
| ***E04G 11/08*** | (2006.01) |

(52) U.S. Cl.

CPC .............. *B28B 7/02* (2013.01); *B28B 7/0014* (2013.01); *E04G 9/08* (2013.01); *E04G 11/087* (2013.01)

(58) Field of Classification Search

CPC ....... B28B 7/0014; B28B 7/02; E01C 19/506; E01F 15/083; E04G 11/087; E04G 9/08

See application file for complete search history.

(56) References Cited

U.S. PATENT DOCUMENTS 4,266,917 A * 5/1981 Godbersen .......... E01F 15/0484 249/8
4,668,462 A * 5/1987 Smith ....................... B28B 7/02 249/82
5,219,473 A * 6/1993 Sandwith ............. B28B 7/0014 249/35
2016/0199998 A1* 7/2016 Daul .................. E01C 19/4886 249/2

* cited by examiner

*Primary Examiner* — Xiao S Zhao
*Assistant Examiner* — Victoria Bartlett
(74) *Attorney, Agent, or Firm* — Andrew F. Young, Esq.; NOLTE LACKENBACH SIEGEL

(57) ABSTRACT

Adjustable concrete forms, typically fabricated from steel, allowing variation in the height, tilt, and shape of the form of gravity wall sections. The adjustable concrete form includes adjustable height vertical and sloped walls to change the height of the form through the operation of built-in mechanical jacks, such as ball screw assemblies. The separation distances at top and bottom of the walls can be adjusted by upper connectors (e.g., tie bars) and lower connectors (e.g., base straps). The same adjustable concrete form is assembled, used to pour a gravity wall section, disassembled, repositioned, and reassembled a virtually unlimited number of times to create varying height, tilt, and shape gravity wall sections for mile after of roadway construction.

9 Claims, 18 Drawing Sheets

ADJUSTABLE CONCRETE FORM

TECHNICAL FIELD

The present invention is directed to concrete construction and, more particularly, to an adjustable concrete form that can be utilized, disassembled, repositioned, reassembled and reused to pour multiple concrete wall sections of varying heights, tilts, and widths for mile after mile of roadway wall construction.

BACKGROUND

This section of this document introduces information about and/or from the art that may provide context for or be related to the subject matter described herein and/or claimed below. It provides background information to facilitate a better understanding of the various aspects of the described technology. This is a discussion of "related" art. That such art is related in no way implies that it is also "prior" art. The related art may or may not be prior art. The discussion in this section of this document is to be read in this light, and not as admissions of prior art.

Concrete has long been used to construct structures of various sizes, shapes, and textures ranging from brick-sized pavers to highways, skyscrapers, and hydroelectric dams. Concrete begins as an aqueous slurry, which generally sets within hours and cures within weeks. While still wet, the slurry can be poured, formed, smoothed, and textured into almost any desired shape, and then allowed to set and eventually harden to permanently remain in that shape. Fully cured concrete is extremely strong and can be reinforced with steel and other internal stiffeners allowing the concrete to be used to fabricate pavement, building supports, highway girders, and other civil engineering structures. Agitating the poured concrete while still wet allows the slurry to fill voids and assume intricate shapes making concrete the most widely used building material worldwide.

The term "concrete form" refers to the shaped solid barrier that holds wet concrete in place while it sets sufficiently to the retain the desired shape once the form is removed. Concrete typically "sets" in a semi-hardened state sufficiently firm to hold its shape after removal of the form within hours (e.g., overnight), while it may take several weeks or months for the concrete to fully cure to its ultimate hardness. Concrete forms range from small metal, plastic, or ceramic pans to large temporary wooden or metal structures that receive multiple cubic yards of concrete pumped from mixing trucks or bins. Some concrete forms serve additional purposes, such as enhanced drying, cooling, insulating, texturing, or incorporating lanyards, hooks, eyes, handles, surface treatments, or other features into the concrete structures fabricated with the forms.

When it comes to road construction, wooden forms assembled from boards and plywood sheets are conventionally used to construct concrete forms for pouring highway side walls, retaining walls, median walls, and similar structures. The term "gravity wall" generally refers to a type of wall that is sufficiently wider at its base than its top to be held in place by gravity alone or with minimal internal reinforcement. Fabricating roadways often involves pouring mile after mile of gravity walls along the sides or medians of the road, which requires mile after mile of concrete forms. In the conventional practice, these forms are fabricated from wooden boards and plywood sheets nailed or screwed together to create a form for each gravity wall section. After a first section has been poured and sufficiently set, the wooden form is disassembled, moved a section down the line, and reassembled to pour the next section of wall. In some case, the components of the wooden forms have to be cut to size, sloped, or otherwise shaped to create wall sections with desired shapes. For example, specially cut forms may be required at transitions for traffic ramps, overpasses, bridges, sound walls, and other roadway features. Inevitably, some portion of the wood components break while specially trimmed wooden components often have to be discarded requiring a continual resupply of wooden boards and plywood sheets as the roadway construction continues mile after mile.

As properly sized and shaped wall construction is required to continue construction of the roadway, any disruption in the supply of the components used to fabricate the concrete forms can temporarily bring the road construction to a halt. Any stoppage in road construction incurs costs in idle workers and lost time. There is, therefore, a continuing need for more functional, effective, and less costly concrete form systems and, more particularly, reusable concrete forms for roadway wall construction.

SUMMARY

The present invention meets the need described above through an adjustable concrete form, typically fabricated from steel, allowing variation in the height, tilt, and shape of the form used to repeatedly pour gravity wall sections. The adjustable concrete form includes adjustable height and tilt vertical and sloped walls, which are tied together at variable distances and top and bottom, to repeatedly change the height, tilt, and shape of the form. The heights and tilts of the vertical and sloped walls of the concrete form are changed through operation of mechanical jacks built into the wall assemblies. The same adjustable concrete forms can be assembled, used to pour a gravity wall section, disassembled, repositioned, and reassembled a virtually unlimited number of times to create a virtually unlimited number gravity wall sections of varying height, tilt, and shape for mile after mile of roadway wall construction.

In a representative embodiment, the adjustable concrete form includes a vertical wall with a vertical wall channel, a movable upper vertical wall slidably received in the vertical wall channel, and a pair of vertical wall mechanical jacks attached to the vertical wall for positioning the movable vertical wall within the vertical wall channel at a desired height or tilt with respect to the vertical wall channel.

The representative adjustable concrete form also includes a sloped wall with a center channel, a movable sloped upper wall slidably received in an upper portion of the center channel, a sloped lower wall slidably received in a lower portion of the center channel, a pair of sloped upper wall mechanical jacks attached to the sloped upper wall for positioning the sloped upper wall within the upper portion of the center channel at a desired height or tilt with respect to the center channel, and a pair of center channel mechanical jacks attached to the sloped wall for positioning the lower portion of the center channel on the sloped lower wall at a desired height or tilt with respect to the sloped lower wall.

The representative adjustable concrete form also includes one or more upper connectors connecting a top portion of the vertical wall an adjustable separation distance from a top portion of the sloped wall, wherein the vertical wall, the sloped wall, and the upper connectors are removably attached together for assembling, disassembling, repositioning, and reassembling for reusing the adjustable concrete form to fabricate of multiple concrete sections. The representative adjustable concrete form may also include one or more base straps connecting a bottom portion of the vertical wall an adjustable separation distance from a bottom portion of the sloped wall. In addition, the representative adjustable concrete form may also include one or more ratchet cleats attached to the adjustable concrete form to tension the one or more base straps to adjust the separation distance between the bottoms of the vertical and sloped walls.

In another representative embodiment, a method for fabricating a series of concrete gravity wall sections includes:

(a) providing an adjustable concrete form, including a vertical wall with a vertical wall channel, a movable upper vertical wall slidably received in the vertical wall channel, and a pair vertical wall mechanical jacks attached to the vertical wall for positioning the movable vertical wall within the vertical wall channel at a desired height or tilt with respect to the vertical wall channel, a sloped wall comprising a center channel, a movable sloped upper wall slidably received in an upper portion of the center channel, a sloped lower wall slidably received in a lower portion of the center channel, a pair of sloped upper wall mechanical jacks attached to the sloped upper wall for positioning the sloped upper wall within the upper portion of the center channel at a desired height or tilt with respect to the center channel, and a pair of center channel mechanical jacks attached to the sloped wall for positioning the lower portion of the center channel on the sloped lower wall at a desired height or tilt with respect to the sloped lower wall, one or more upper connectors connecting a top portion of the vertical wall an adjustable separation distance from a top portion of the sloped wall, one or more base straps connecting a bottom portion of the vertical wall an adjustable separation distance from a bottom portion of the sloped wall, one or more ratchet cleats attached to the adjustable concrete form to tension the one or more base straps, wherein the vertical wall, the sloped wall, and the upper connectors are removably attached together for assembling, disassembling, repositioning, and reassembling for reusing the adjustable concrete form to fabricate of multiple concrete sections;

(b) assembling the adjustable concrete form with the vertical wall attached to and spaced apart from the sloped wall;

(c) actuating the pair vertical wall mechanical jacks to position the movable vertical wall within the vertical wall channel at a desired height or tilt with respect to the vertical wall channel;

(d) actuating the pair of sloped upper wall mechanical jacks to position the sloped upper wall within the upper portion of the center channel at a desired height or tilt with respect to the center channel;

(e) actuating the pair of center channel mechanical jacks to position the lower portion of the center channel on the sloped lower wall at a desired height or tilt with respect to the sloped lower wall;

(f) attaching a trailing end of the adjustable concrete form to a structure to close the trailing end of the adjustable concrete form;

(g) attaching a leading end of the adjustable concrete form to an end plate to close the leading end of the adjustable concrete form;

(h) pouring a first quantity of wet concrete into the adjustable concrete form;

(i) allowing the first quantity of wet concrete to set to form a first concrete section;

(j) repeating steps (b) through (i);

(k) attaching a trailing end of the adjustable concrete form to a leading end of the first concrete section;

(l) pouring wet concrete into the adjustable concrete form;

(m) allowing the wet concrete to set to form a second concrete section contiguous with the first concrete section, (n) repeating steps (j) through (m) to form additional concrete sections.

It will be understood that specific embodiments may include a variety of features and options in different combinations, as may be desired by different users. Practicing the invention does not require utilization of all, or any particular combination, of these specific features or options. The specific techniques and structures for implementing particular embodiments of the invention and accomplishing the associated advantages will become apparent from the following detailed description of the embodiments and the appended drawings and claims.

The above presents a simplified summary in order to provide a basic understanding of some aspects of the invention. This summary is not an exhaustive overview of the invention. It is not intended to identify key or critical elements of the disclosure or to delineate the scope of the invention. Its sole purpose is to present some concepts in a simplified form as a prelude to the following more detailed description, appended drawings, and claims.

BRIEF DESCRIPTION OF THE FIGURES

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
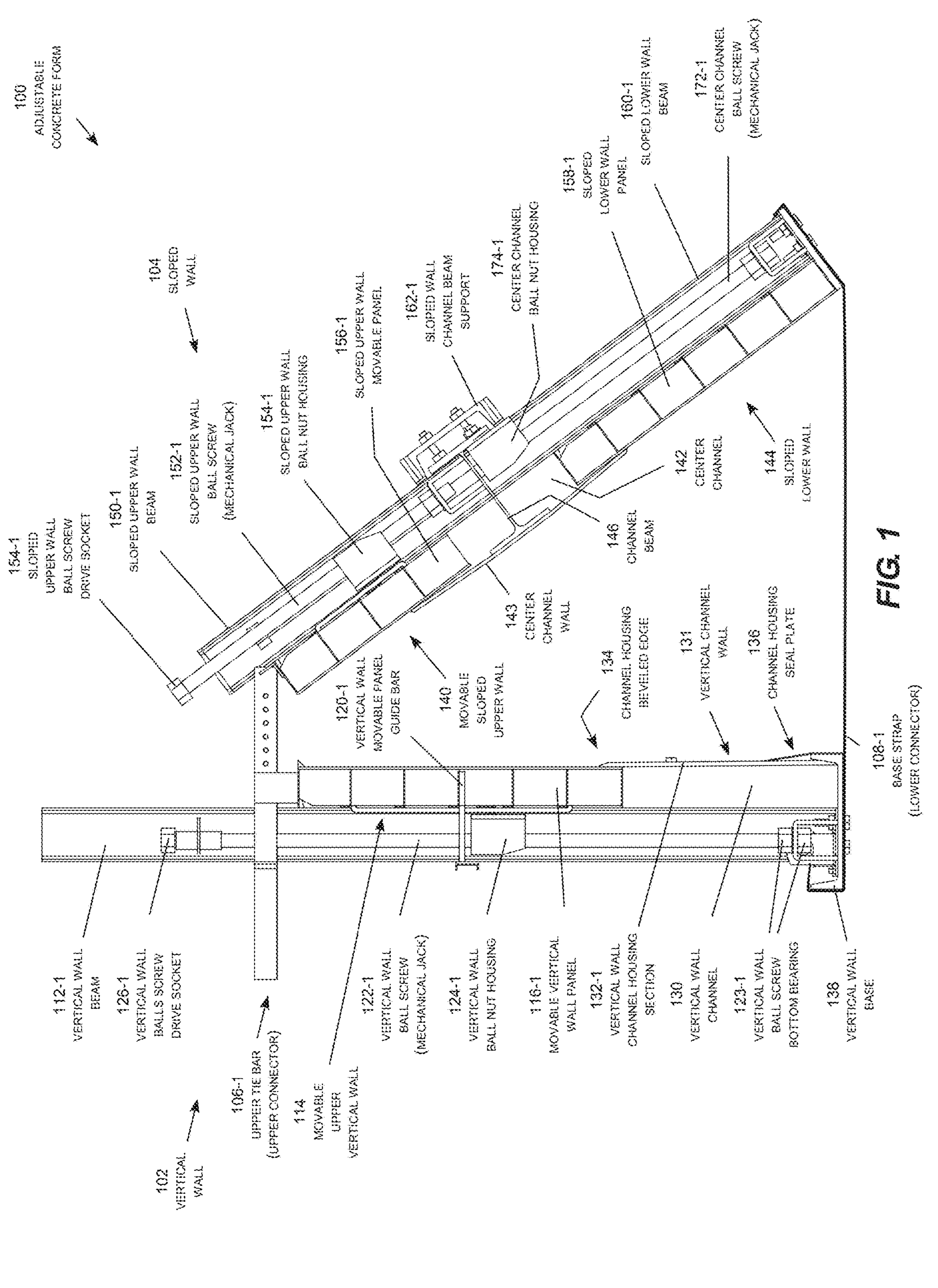
FIG. 1 is an end elevation view of an adjustable concrete form.

While the invention is susceptible to various modifications and alternative forms, the drawings illustrate representative embodiments of the invention by way of example. It should be understood, however, that the description of specific examples is not intended to limit the invention to the particular forms disclosed, but on the contrary, the intention covers all modifications, equivalents, and alternatives falling within the spirit and scope of the invention as defined by the appended claims.

DESCRIPTION OF ILLUSTRATIVE EMBODIMENTS

Embodiments of the present invention include adjustable concrete forms, typically fabricated from steel, allowing variation in the height, tilt, and shape of the form used to pour gravity wall sections. The adjustable concrete form includes adjustable height and tilt vertical and sloped walls to change the height and tilt of the form through the operation of built-in mechanical jacks, such as ball screw assemblies. The separation distances at top and bottom of the walls can be adjusted by upper connectors (e.g., tie bars) and lower connectors (e.g. base straps). The same adjustable concrete form is assembled, used to pour a gravity wall section, disassembled, repositioned, and reassembled a virtually unlimited number of times to create varying height, tilt, and shape gravity wall sections for mile after of roadway construction.

While ball screw assemblies are described as representative mechanical jacks in the illustrative embodiments, it will be appreciated that other types of mechanical jacks may be utilized as a matter of design choice, such as hydraulic or pneumatic cylinders, hydraulic or pneumatic bladders, ratchet and pawl assemblies, electric or magnetic actuators, overhead cranes, and other suitable mechanical jacks. It will nevertheless be appreciated that the representative ball screw assemblies exhibit advantages for the adjustable concrete form including compact size, light weight, convenient actuation with a separate electric or pneumatic handheld drill, continuous positional adjustment, ruggedness, dust and dirt resistance, weather resistance, ease of assembly and disassembly, and so forth.

Although tie bars are described as representative upper connectors in the illustrative embodiments, other types of upper connectors may be utilized as a matter of design choice, such as turnbuckles, hydraulic or pneumatic cylinders, hydraulic or pneumatic bladders, ratchet and pawl assemblies, electric or magnetic actuators, and other suitable adjustable mechanical connectors. It will nevertheless be appreciated that the representative tie bar assemblies exhibit advantages for the adjustable concrete form including compact size, light weight, convenient operation with hand tools, ruggedness, dust and dirt resistance, weather resistance, crack and breakage resistance, ultraviolet light resistance, ease of assembly and disassembly, and so forth.

Although ratchet-tensioned fabric straps are described as representative lower connectors in the illustrative embodiments, other types of upper connectors may be utilized as a matter of design choice, such as turnbuckles, hydraulic or pneumatic cylinders, hydraulic or pneumatic bladders, ratchet and pawl assemblies, electric or magnetic actuators, and other suitable adjustable mechanical connectors. It will nevertheless be appreciated that the representative ratchet strap assemblies exhibit advantages for the adjustable concrete form including low cost allowing the fabric straps to the left in place as sacrificial components after the concrete section has been poured, large range of adjustable length, convenient manual operation without the need for hand tools, ruggedness, dust and dirt resistance, weather resistance, crack and breakage resistance, ease of assembly and disassembly, and so forth.

Although the beams, channels, wall sections, wall bases, seal plates, housings, and most other structural components of the adjustable concrete form are typically fabricated from steel, other substrate materials may be utilized as a matter of design choice. For example, many of these components may be cost effectively fabricated from wooden boards and plywood sheets. As another example, many of these components may be cost effectively fabricated from carbon and plastic materials and blends, such as polycarbonate (PC), Acrylonitrile Butadiene Styrene (ABS), high density polyethylene (HDPE), nylon, glass-filled nylon, graphene, fiberglass, and the like. It will nevertheless be appreciated that the representative steel assemblies exhibit advantages for the adjustable concrete form including rust resistance in painted, electroplated, stainless and galvanized components, ultraviolet light resistance, malleability, crack and breakage resistance, low cost, amenability to in-field welding and other types of working, familiarity to current construction technicians, ruggedness, dust and dirt resistance, weather resistance, ultraviolet light resistance, ease of assembly and disassembly, and so forth.

Although the representative adjustable concrete form is described for fabrication of gravity wall sections that generally do not require internal reinforcement, it will be appreciated that the concrete sections fabricated with the adjustable concrete form may include any type of desired internal reinforcement fibers, bars, cages, or other structures, such as, for example, rebar, metal wires, tire belts, fiberglass, fabric, etc. The concrete sections may also be fabricated to include other features, such as hooks, handles, eyes, etc., extending out the top, bottom, ends or sides of the poured concrete sections. Those skilled in the field of concrete construction will readily understand how to adapt the wall and end panels to accommodate these types of features.

In addition, although the representative gravity wall sections are wider at bottom than top, it will also be appreciated that the adjustable concrete form may be readily adapted to pour concrete sections with vertical walls on both sides, sections that are narrower at bottom than top, sections with sloped end portions, arcuate sections, and so forth. The adjustable concrete form may also be used to fabricate modular concrete sections with built-in lifting eyes and/or connection brackets suitable for transportation and assembly at locations other than the fabrication site, such as modular wall panels, modular floor panels, modular median panels, modular pavement panels, and the like.

Reference will now be made in detail to embodiments of the invention. In general, the same or similar reference numerals are used in the drawings and the description to refer to the same or similar parts or steps. The drawings are in simplified form and are not to precise scale unless specifically indicated. The words "couple" and similar terms do not necessarily denote direct and immediate connections, but also include connections through intermediate elements or devices. Certain descriptors, such "first" and "second," "top" and "bottom," "upper" and "lower," "inner" and "outer," "trailing" and "leading", or similar relative terms may be employed to differentiate similar structures from each other. These descriptors are utilized as a matter of descriptive convenience and are not employed to implicitly limit the invention to any particular position or orientation.

FIG. 1 is an end elevation view of an adjustable concrete form 100, which in this example is shown approximately to scale with 30-foot long, 8-foot maximum height vertical and sloped walls 102, 104 attached together at top by a series of upper connectors. In this example tie bars represented by the enumerated upper tie bar 106-1, and at bottom by a series of lower connectors, in this example fabric ratchet straps represented by the enumerated base strap 108-1. The separation distance between the vertical and sloped walls 102, 104 at the top of the form is typically in the range of 8-inches to 2-feet, while the separation at the base of the form is typically in the range of 2 to 5 feet. While these dimensional are generally set as a matter of convention for standard roadway construction, the concrete form 100 can be scaled up or down and shaped to construct walls of different sizes and shapes, such as linear, arcuate, tilted, sloped and other desired shapes and surface treatments as a matter of design choice. The trailing and leading ends of the form 100 are closed with end panels or by abutting the form to a previously poured concrete section or other structure, Wet concrete is typically poured into the top of the form into the space between the upper ends of the vertical and sloped walls 102, 104. The wet concrete is usually agitated to fill voids and allowed to set sufficiently for the poured concrete wall to hold its shape. For example, a newly poured concrete section utilizing the representative 30-foot by 8-foot maximum height adjustable form 100 shown in the figures will typically be allowed to set overnight before disassembling and removing the form. Once the concrete has set sufficiently to hold its shape, the form 100 is disassembled, repositioned, reassembled, and used to pour another concrete section or stored for future use.

Figure 2:
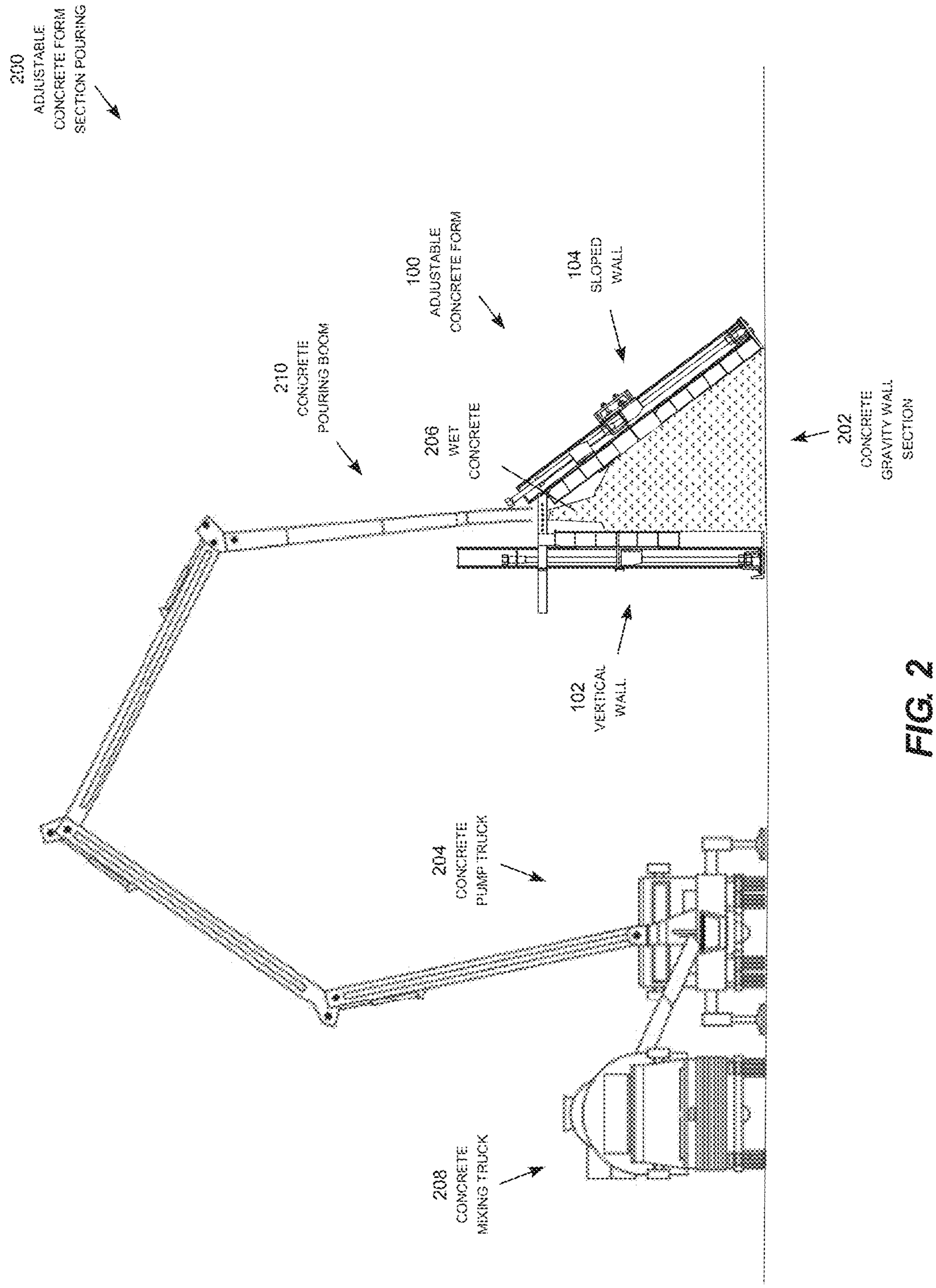
FIG. 2 is a conceptual elevation diagram illustrating pouring of a section of a gravity wall using the adjustable concrete form.

FIG. 2 is an conceptual elevation diagram 200 illustrating pouring of a gravity wall section 202 using the adjustable concrete form 100. Prior to pouring the wet concrete, the vertical and sloped walls 102, 104 are adjusted to their desired heights and/or tilts using the built-in mechanical jacks. The walls 102, 104 are secured to each other at top using the upper connectors (e.g., tie bars) to achieve the desired separation distances at top. The walls 102, 104 are also secured at bottom using the lower connectors (e.g., base straps) to achieve the desired separation distances at bottom. It will be appreciated that the heights, tilts, slopes, and separation distances of the of the vertical and sloped walls 102, 104 may vary, as desired, over the 30-foot length of the adjustable concrete form 100. The ends of the concrete form 100 are also closed with end plates or by abutting the form to a previously poured concrete section or other structure. Once the form 100 is set up, a concrete pump truck 204 delivers wet concrete 206 from a mixing truck 208 or other concrete mixing bin through a concrete pouring boom 210 into the space between the tops of the vertical and sloped walls 102, 104. The wet concrete 206 is poured to the desired height, typically but not necessarily to or near the tops of the walls 102, 104, agitated to fill voids, and allowed to set sufficiently to retain its shape before disassembling and removing the adjustable concrete form 100. The top of the of the concrete wall section may be smoothed or textured, or fitted with an upper sealing, buffer or decorative material, as desired. As shown in greater detail in subsequent figures, the height and tilt of each end of the vertical and sloped walls 102, 104 can be adjusted within predefined ranges using mechanical jacks, such as the ball screw assemblies built into the walls in the representative embodiments.

Figure 3A:
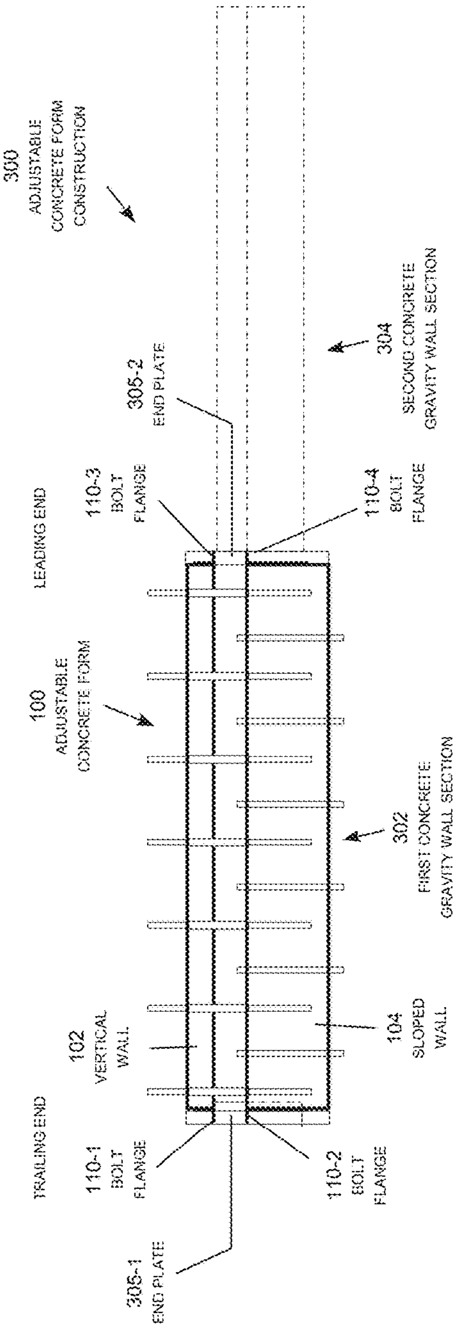
FIG. 3A is a top view conceptual diagram illustrating pouring of a first section of a gravity wall using the adjustable concrete form.
Figure 3B:
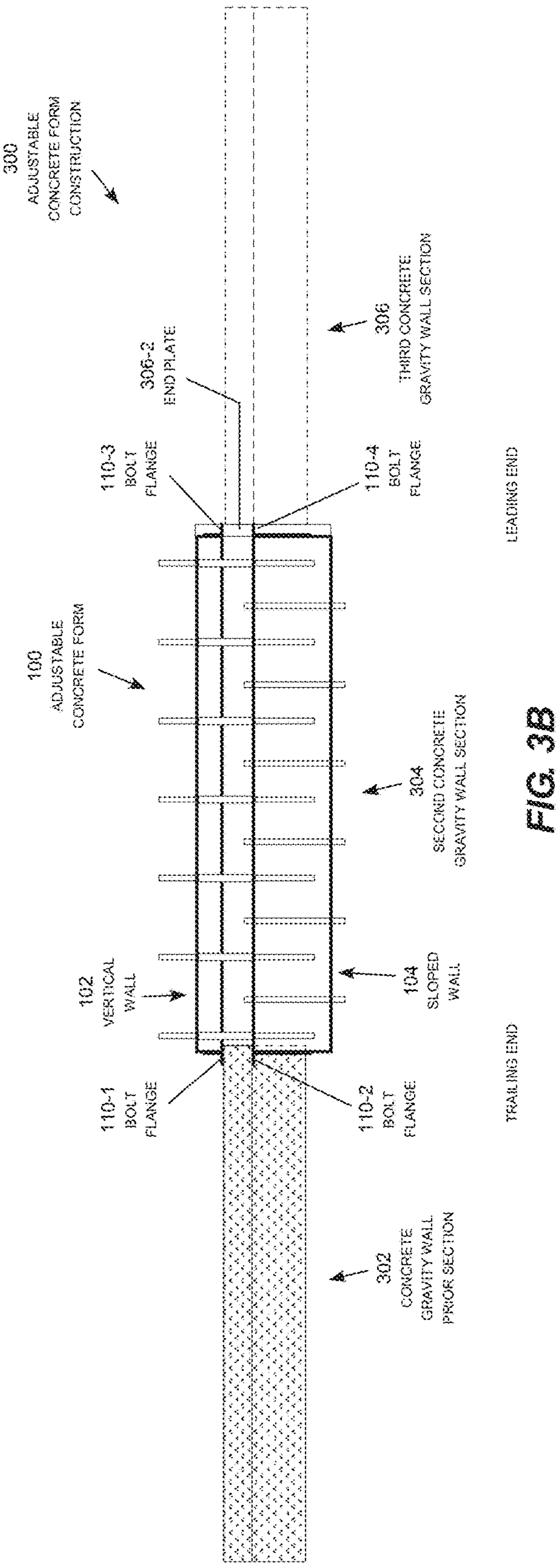
FIG. 3B is a top view conceptual diagram illustrating pouring of a second section of the gravity wall using the adjustable concrete form.

FIGS. 3A and 3B are top view conceptual diagrams 300 illustrating pouring first, second and third sections 302, 304, and 306 of a gravity wall using the adjustable concrete form 100. The heights at both ends of the fixed wall 102 and the sloped wall 104 are set to the desired heights and/or tilts through operation of the built-in mechanical jacks, in this example ball screw assemblies. The upper and lower wall separation distances are also set to their desired distances using the upper connectors (e.g., tie bars) and lower connectors (e.g., base straps and associated ratchets). An end plate or another structure sealing the trailing end of the first concrete section 302 to be poured is attached to the trailing end of the form 100. In this example, an end plate 305-1 is attached to bolt flanges 110-1 and 110-2 at the trailing end of the form 100. Similarly, the leading end of the form 100 is attached to another sealing structure. In this particular example, an end plate 305-2 is attached to bolt flanges 110-3 and 110-4 at the leading end of the form 100. The first concrete gravity wall section 302 is then poured, agitated, and allowed to set. Once the concrete has set sufficiently to hold its shape, the adjustable concrete form 100 is disassembled, moved one section down the line, and reassembled.

Again for the second concrete section 304, the heights at both ends of the fixed and sloped wall 102, 104 are set to the desired heights and/or tilts, and the upper and lower wall separation distances are set. For the second example concrete section 304, the bolt flanges 110-1 and 110-2 at the trailing end of the form 100 are attached to the exposed leading end of the first gravity wall section 302, while the end plate 305-2 is attached to the bolt flanges 110-3 and 110-4 at the leading end of the form 100. The second concrete gravity wall section 304 is then poured and allowed to set. Once again, after the newly poured concrete section has set has set sufficiently to retain its shape, the adjustable concrete form 100 is disassembled, moved another section down the line, and reassembled. The desired wall heights, tilts, and separation distances are again set, and the bolt flanges at the trailing and leading ends of the form are secured to close the trailing and leading ends of the form. 100. The third concrete gravity wall section 306 is then poured and allowed to set, and so on, potentially for mile after mile of roadway wall or other structure construction.

Figure 4:
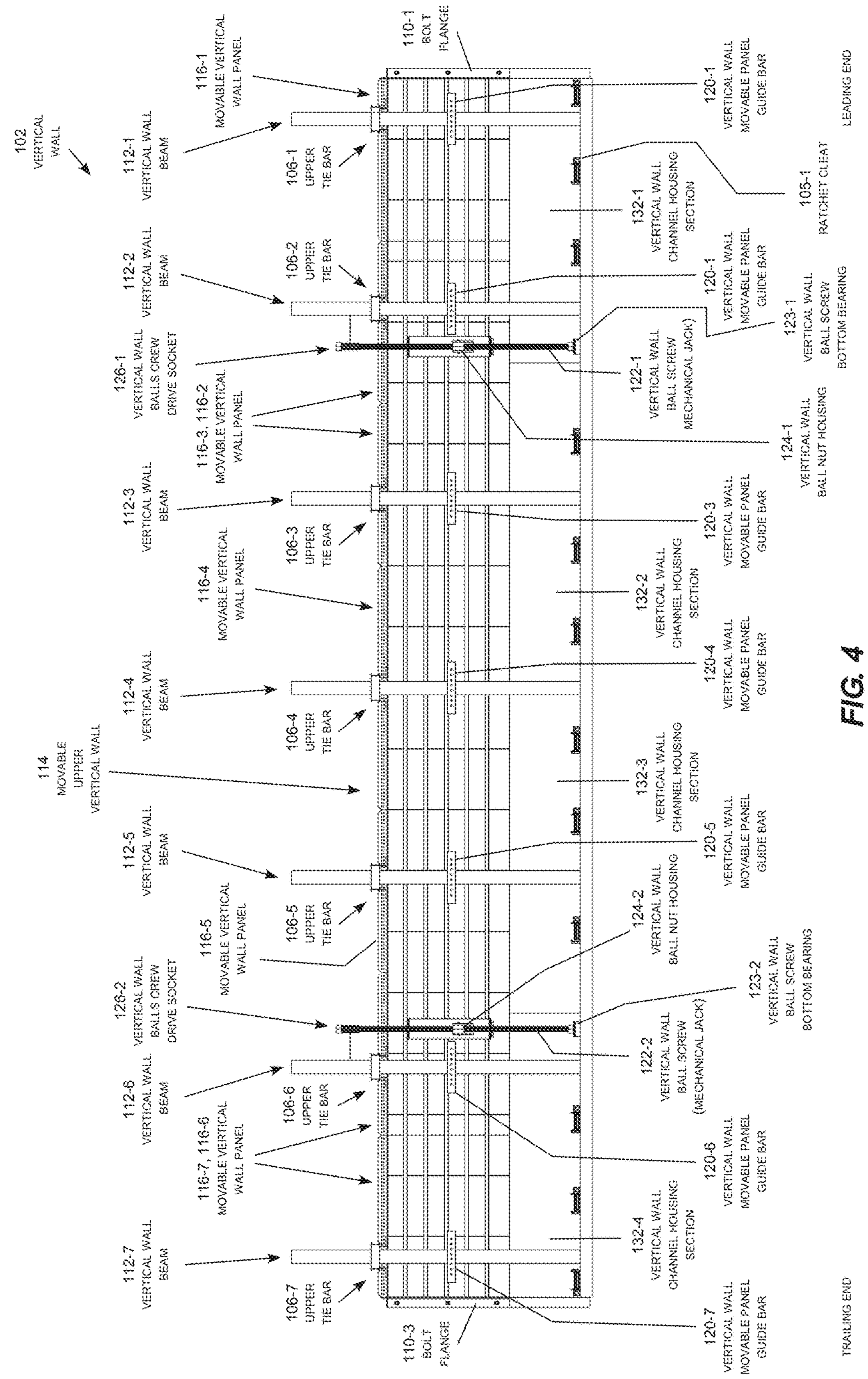
FIG. 4 is a side elevation view of an adjustable height vertical wall of the adjustable concrete form.
Figure 5:
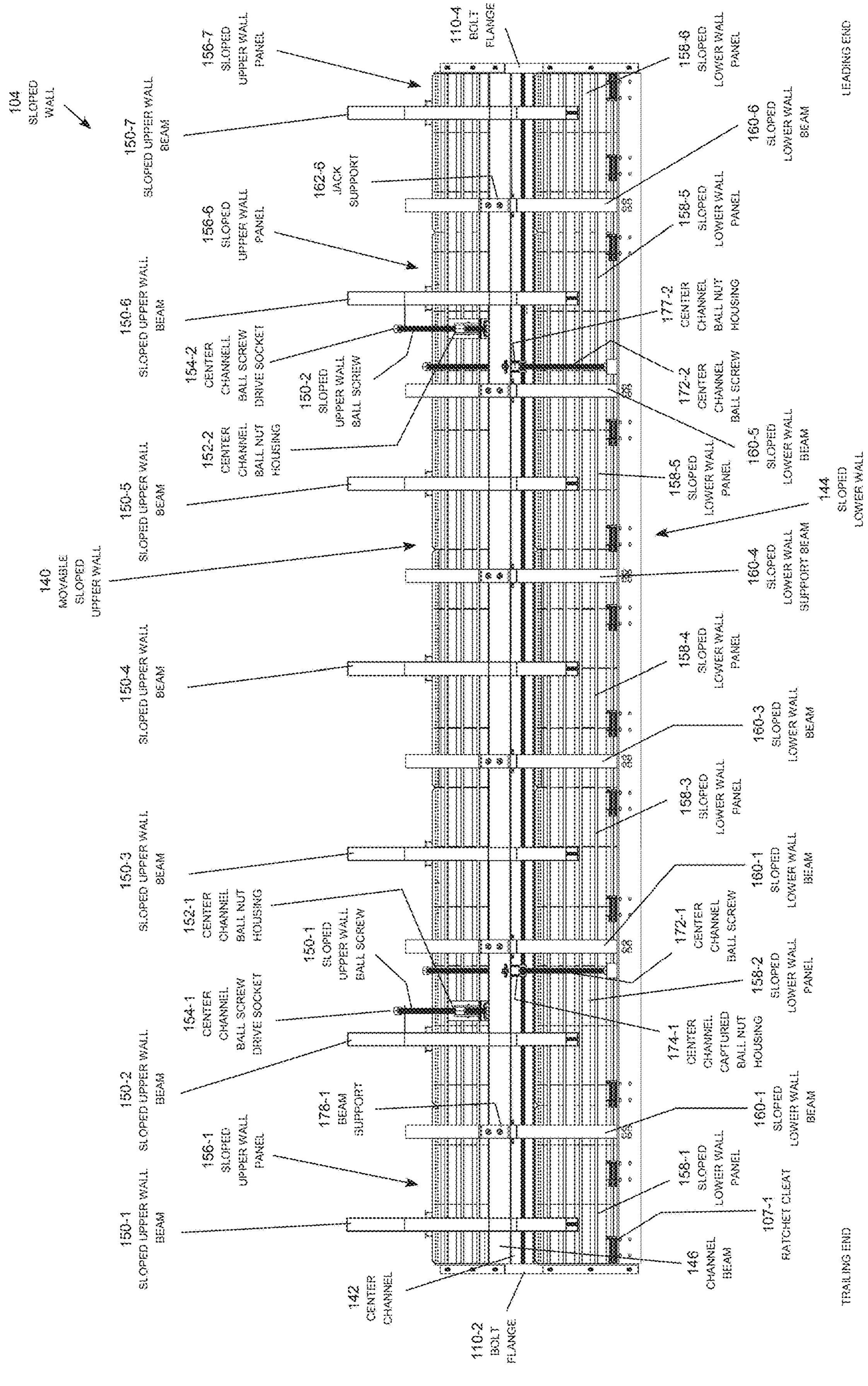
FIG. 5 is a side elevation view of an adjustable height sloped wall of the adjustable concrete form.
Figure 6:
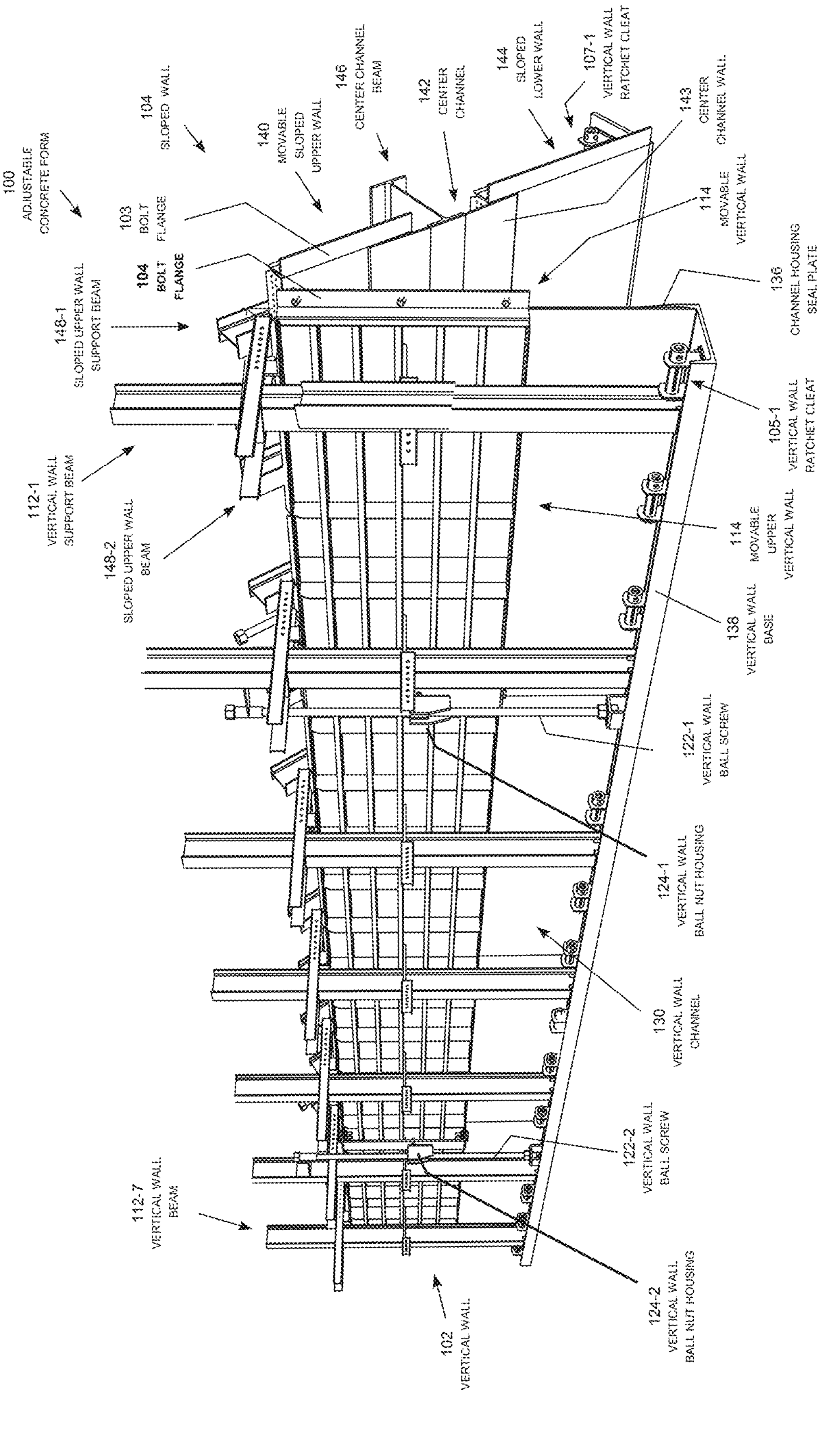
FIG. 6 is a side perspective view primarily showing the adjustable height vertical wall of the adjustable concrete form.
Figure 7:
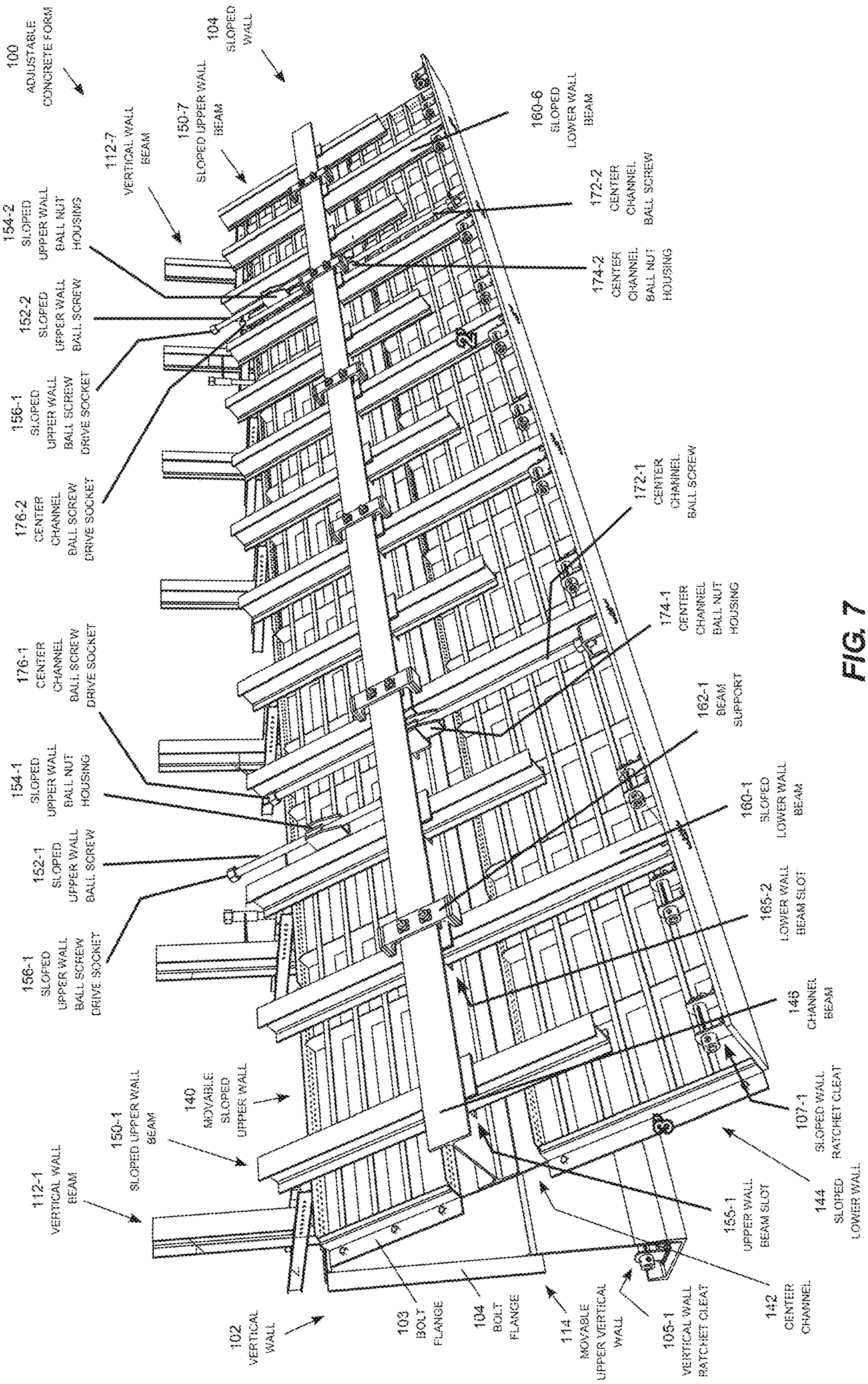
FIG. 7 is a side perspective view primarily showing the adjustable height sloped wall of the adjustable concrete form.

FIG. 4 is a side elevation view of the adjustable height vertical wall 102 of the adjustable concrete form 100, FIG. 5 is a side elevation view of the adjustable height sloped wall 104, FIG. 6 is a side perspective view primarily showing the vertical wall, and FIG. 7 is a side perspective view primarily showing the sloped wall. Referring to these figures together with FIG. 1, the vertical wall 102 includes vertical wall beams 112-1 through 112-7 supporting the movable upper vertical wall 114, which includes movable vertical wall panels 116-1 through 116-7. The movable vertical wall panels 116-1 through 116-7 may be bolted or welded together (or adjusted independently with the addition of a ball screw assembly for each independently adjusted panel) forming the 30-foot long movable upper vertical wall 114. The upper portions of the vertical wall beams 112-1 through 112-7 are supported by the upper tie bars 106-1 through 106-7, respectively, removably attaching the top of the vertical wall 102 to the top of the sloped wall 104. At bottom, the representative base strap 108-1 connects to rachet cleats 105-1 and 107-1 attached to the bottoms of the vertical wall 102 and the sloped wall 104, respectively. The tie bars are removed and reused, while the sacrificial base straps are removed from the ratchet cleats and left in placed after each concrete section has been poured.

Referring to FIGS. 1, 4 and 6, the vertical wall 102 also includes vertical wall movable panel guide bars 120-1 through 120-7 slidably attaching respective vertical wall support beams 112-1 through 112-7 to respective movable panels 116-1 through 116-7. The movable panels 116-1 through 116-7 may be bolted or welded to each other (or adjusted independently with the addition of a separate ball screw assembly for each independently adjustable panel), forming the 30-foot long movable upper vertical wall 114. This panel is selectively tilted and translated by two mechanical jacks, in this particular embodiment the vertical wall ball screws 122-1 and 122-2, which rotate in respective vertical wall bottom bearings 123-1 and 123-2. A construction technician uses a mechanical driver, such as a pneumatic or battery-powered screw driver, to rotate vertical wall drive sockets 1261 and 126-2 on the ends of respective ball screws 122-1 and 122-2 to cause the ball nuts captured on their respective ball screws to travel up and down on the ball screws converting rotation of the ball screws into vertical movement of the ball nuts.

A ball nut housing 124-1 is attached to the ball nut captured on the ball screw 122-1 and to the movable vertical wall 114 offset from the longitudinal center toward the trailing end of the vertical wall allowing rotation of the vertical wall drive socket 126-1 to tilt and translate the movable wall 114. The ball nut housing 124-1 also rotates slightly with respect to the ball screw 122-1 allowing the movable vertical wall 114 to tilt in response to rotation of the ball screw 122-1 without binding on the ball screw. Similarly, the ball nut housing 124-2 is attached to the ball nut captured on the ball screw 122-2 and to the movable vertical wall 114 offset from the longitudinal center toward the leading end of the vertical wall allowing rotation of the vertical wall drive socket 126-2 to tilt and translate the movable wall 114. Again, the ball nut housing 124-2 rotates slightly with respect to the ball screw 122-2 allowing the movable vertical wall 114 to tilt in response to rotation of the ball screw 122-2 without binding on the ball screw.

The vertical wall 102 also includes a vertical wall channel 130 formed by a vertical channel wall 131 including vertical wall channel housing sections 132-1 through 132-4, which may be bolted or welded together to form the 30-foot long a vertical wall channel. The movable vertical wall 114 slides within the vertical wall channel 130 in response to rotation of the ball screws 122-1 and 122-2 tilting and translating the vertical movable wall up and down on the ball screws. A channel housing beveled edge 134 and a channel housing seal plate 136 prevent or inhibit wet concrete from infiltrating the vertical wall channel 130. The representative base strap 108-1 is routed under and wraps around the vertical wall base 138 and into the representative ratchet cleats 105-1 and 107-1 on the bottom ends of the vertical and sloped walls 102, 104.

Referring to FIGS. 1, 5 and 7, the sloped wall 104 includes a movable sloped upper wall 140, which includes movable upper wall panels 156-1 through 156-7, which may be bolted or welded to each other (or adjusted independently with a ball screw assembly provided for each independently adjustable panel) forming the 30-foot long movable sloped upper wall 140. The sloped wall 104 also includes a sloped lower wall 144, which includes sloped lower wall panels 158-1 through 158-6 bolted or welded to each other forming the 30-foot long sloped lower wall 144. The movable sloped upper wall 140 tilts and translates within a center channel 142, which in turn slides on a sloped lower wall 144. A channel beam 146 is attached to and drives the movement of the center channel 142. The movable sloped upper wall 140 tilts and translates within an upper portion of the center channel 142 above the channel beam 146, while the lower portion of the center channel 142 tilts and translates on the sloped lower wall 144, which is received within the center channel 142 below the channel beam 146. The movable sloped upper wall 140 and the center channel 142 are driven by separate sets of mechanical jacks, as described below.

The sloped wall 104 includes sloped upper wall beams 150-1 through 150-7, which support the sloped upper wall panels 156-1 through 156-7, respectively, and extend through respective upper wall beam slots represented by the enumerated upper wall beam slot 155-1 allowing the sloped upper wall 144 to tilt and translate independently of the center channel 142. The sloped wall 104 further includes sloped lower wall beams 160-1 through 160-6, which support the sloped lower wall panels 158-1 through 156-6, respectively, and extend through respective lower beam slots represented by the enumerated lower beam slot 165-1 allowing the center channel 142 to tilt and translate independently of the sloped lower wall 144.

The sloped wall 104 also includes sloped upper wall ball screws 152-1 and 152-2, sloped upper wall ball nut housings 154-1 and 154-2, and sloped upper wall ball screw drive sockets 156-1 and 156-2 allowing rotation of the sloped upper wall ball screw drive sockets to independently tilt and translate the movable sloped upper wall 140 within the upper portion of the center channel 142. Similarly, the sloped lower wall ball screws 172-1 and 172-2, sloped lower wall ball nut housings 174-1 and 174-2, and sloped lower wall ball screw drive sockets 176-1 and 176-2 allow rotation of the sloped lower wall ball screw drive sockets to independently tilt and translate the center channel 142 on the upper portion of the sloped lower wall 144. Beam supports represented by the enumerated beam 178-1 support the channel beam 146 while allowing the center channel 142 to tilt and translate independently of the movable sloped upper wall 140 and the sloped lower wall 144.

Figure 8:
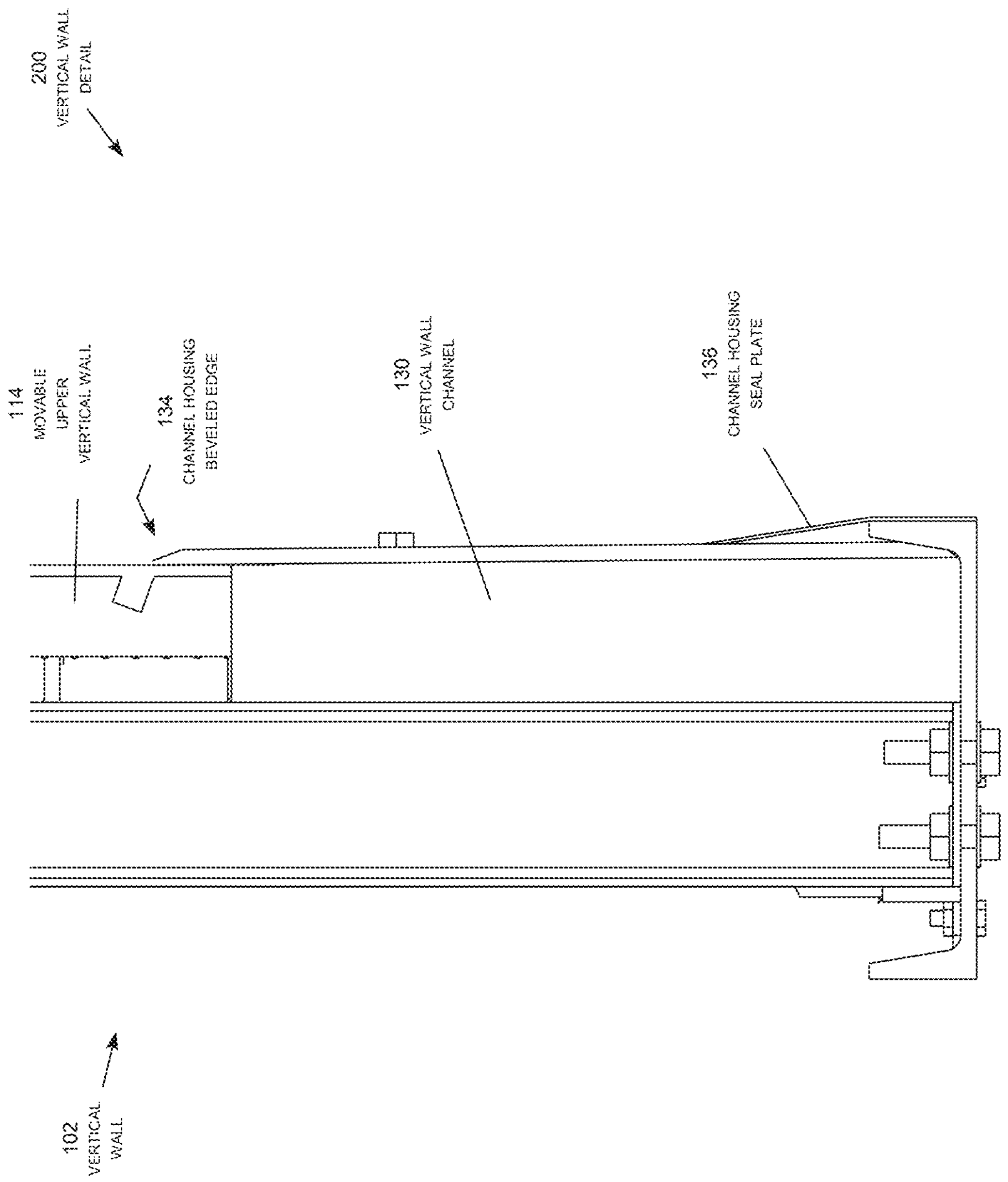
FIG. 8 is an end elevation view of a detail of the vertical wall of the adjustable concrete form.

FIG. 8 is an end elevation view 200 of a detail of the vertical wall 102 of the adjustable concrete form 100. This detail provides an enlarged view of the movable upper vertical wall 114, which slides within the vertical wall channel 130. The channel housing beveled edge 134 and the channel housing seal plate 136 prevent or inhibit wet concrete from infiltrating the vertical wall channel 130 allowing the movable upper vertical wall 114 to move freely within the channel.

Figure 9:
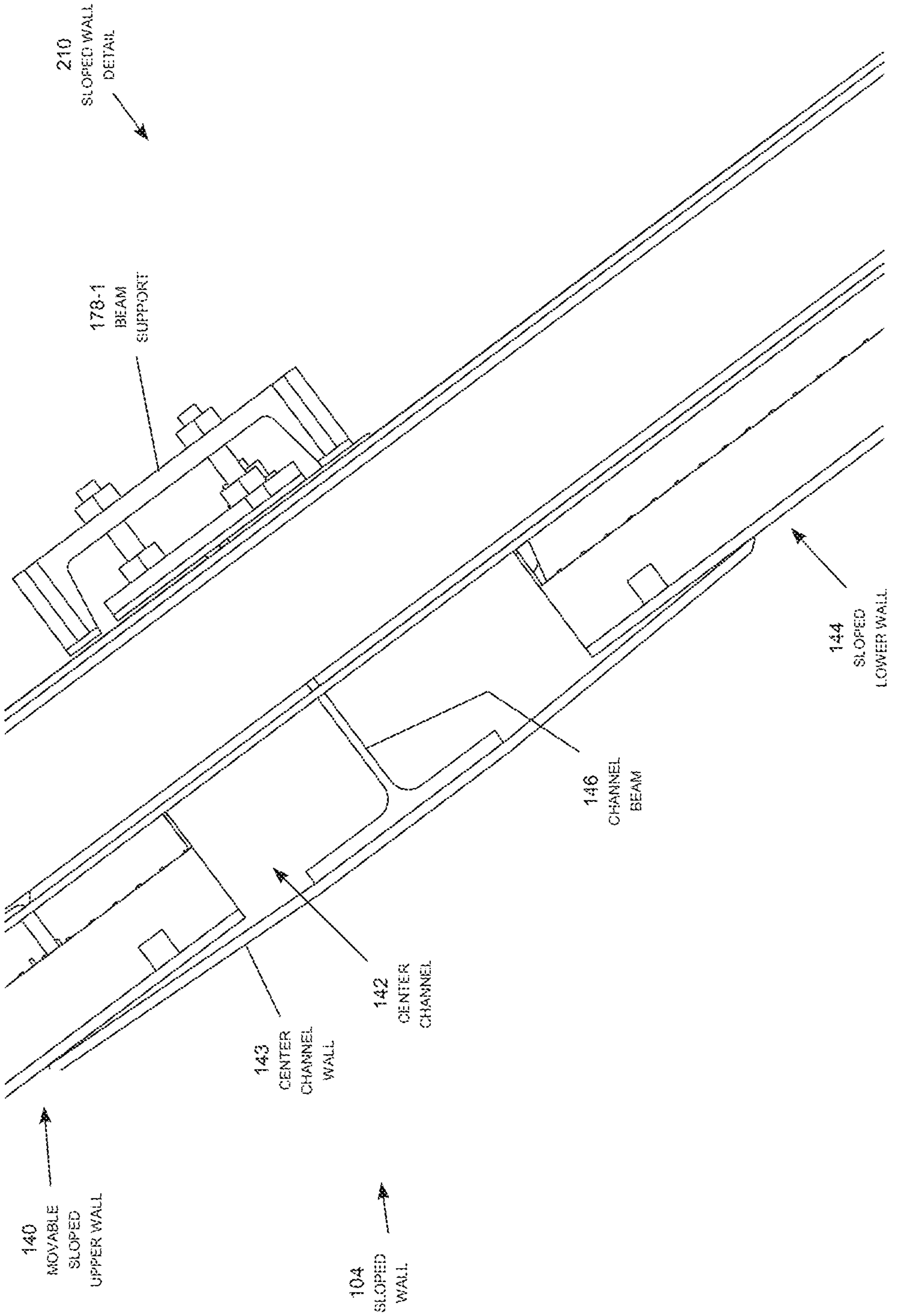
FIG. 9 is an end elevation view of a detail of the sloped wall of the adjustable concrete form.

FIG. 9 is an end elevation view of a detail 210 of the sloped wall 104 of the adjustable concrete form 100. This detail provides an enlarged view of the movable sloped upper wall 140, which slides within the upper portion of the center channel 142 above the channel beam 146. In addition, the lower portion center channel 142 below the channel beam 146 slides independently on the upper portion of the sloped lower wall 144. The representative beam support 178-1 allows the center channel 142 to tilt and translate independently of the movable sloped upper wall 140 and the sloped lower wall 144 while supporting the channel beam 146.

FIGS. 10-13 are conceptual side elevation views of the vertical wall 102 of the adjustable concrete form 100 illustrating the independent tilting and translating of the movable vertical wall 114. The movable vertical wall 114 can be placed into any intermediate position between the limits illustrated by FIGS. 10-13.

Figure 10:
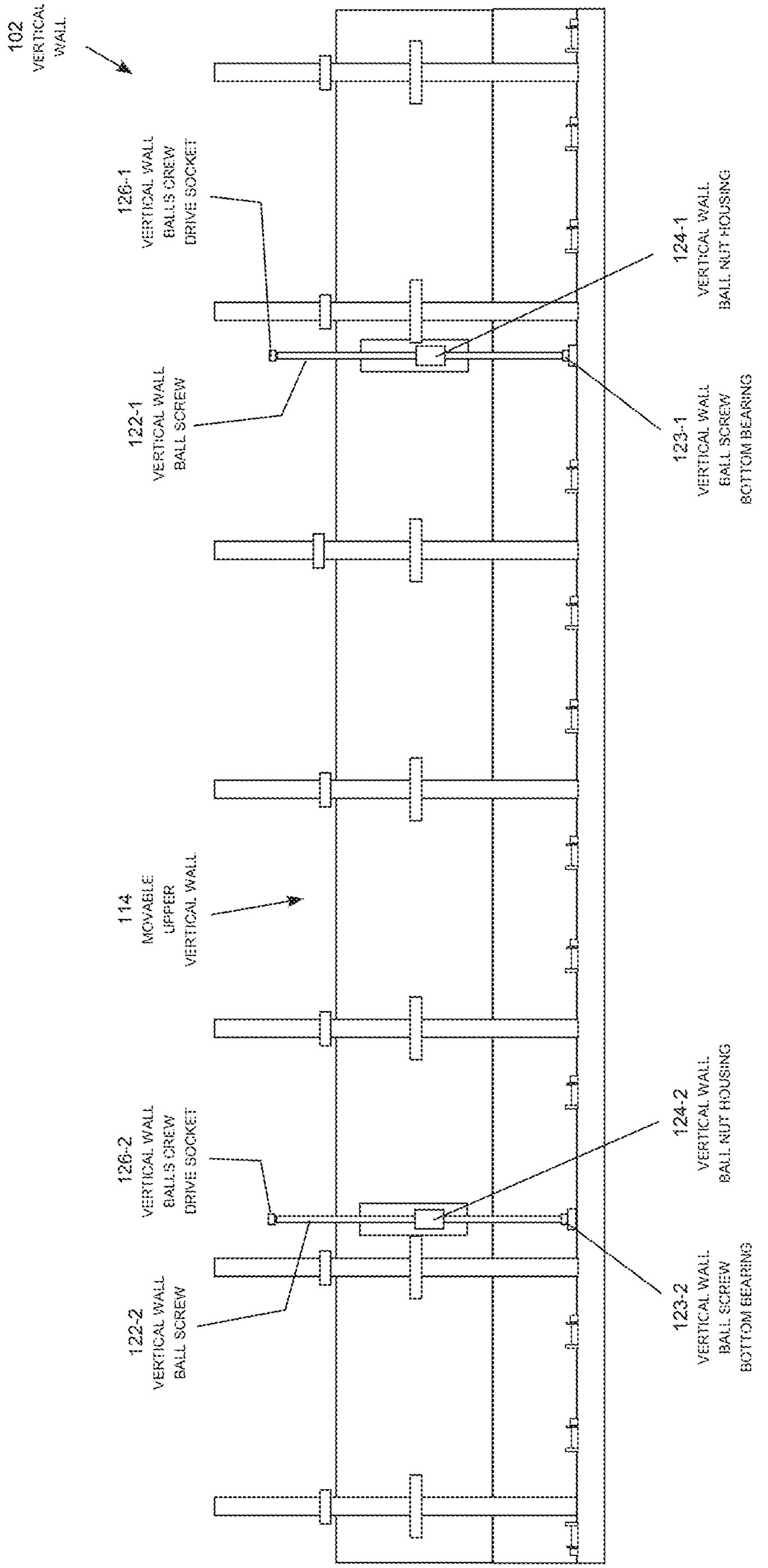
FIG. 10 is a conceptual side elevation view of the vertical wall of the adjustable concrete form in a first position.

FIG. 10 shows the adjustable concrete form 100 with the movable upper vertical wall 114 in its upper position. The vertical wall 102 is approximately 30-feet long and approximately 8-feet tall with the movable upper vertical wall 114 in its upper position as shown in FIG. 10. The upper position of the movable upper vertical wall 114 is reached by raising both mechanical jacks to their upper positions. In this particular embodiment, the movable upper vertical wall 114 is placed in its upper position by rotating the vertical wall ball screw drive sockets 1261 and 126-2 until the vertical wall ball nut housings 124-1 and 124-2 reach their upper limits.

Figure 11:
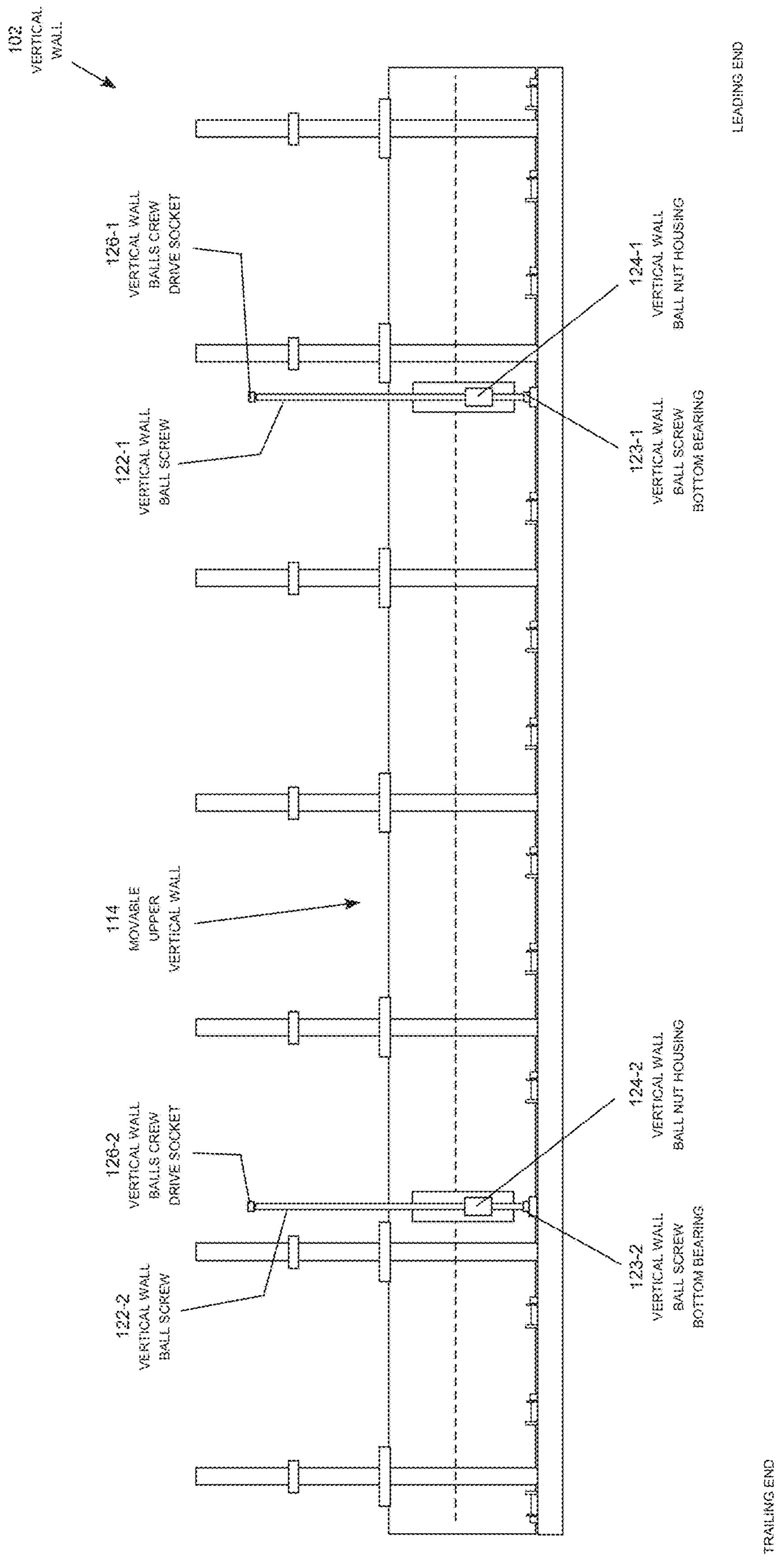
FIG. 11 is a conceptual side elevation view of the vertical wall of the adjustable concrete form in a second position.

FIG. 11 shows the adjustable concrete form 100 with the movable upper vertical wall 114 in its lower position. The vertical wall 102 is approximately 5-feet tall with the movable upper vertical wall 114 in its lower position as shown in FIG. 11. The lower position of the movable upper vertical wall 114 is reached by lowering both mechanical jacks controlling the position of this wall to their lower positions. In this particular embodiment, the movable upper vertical wall 114 is placed in its lower position by rotating the vertical wall ball screw drive sockets 126-1 and 126-2 until the vertical wall ball nut housings 124-1 and 124-2 reach their lower limits.

Figure 12:
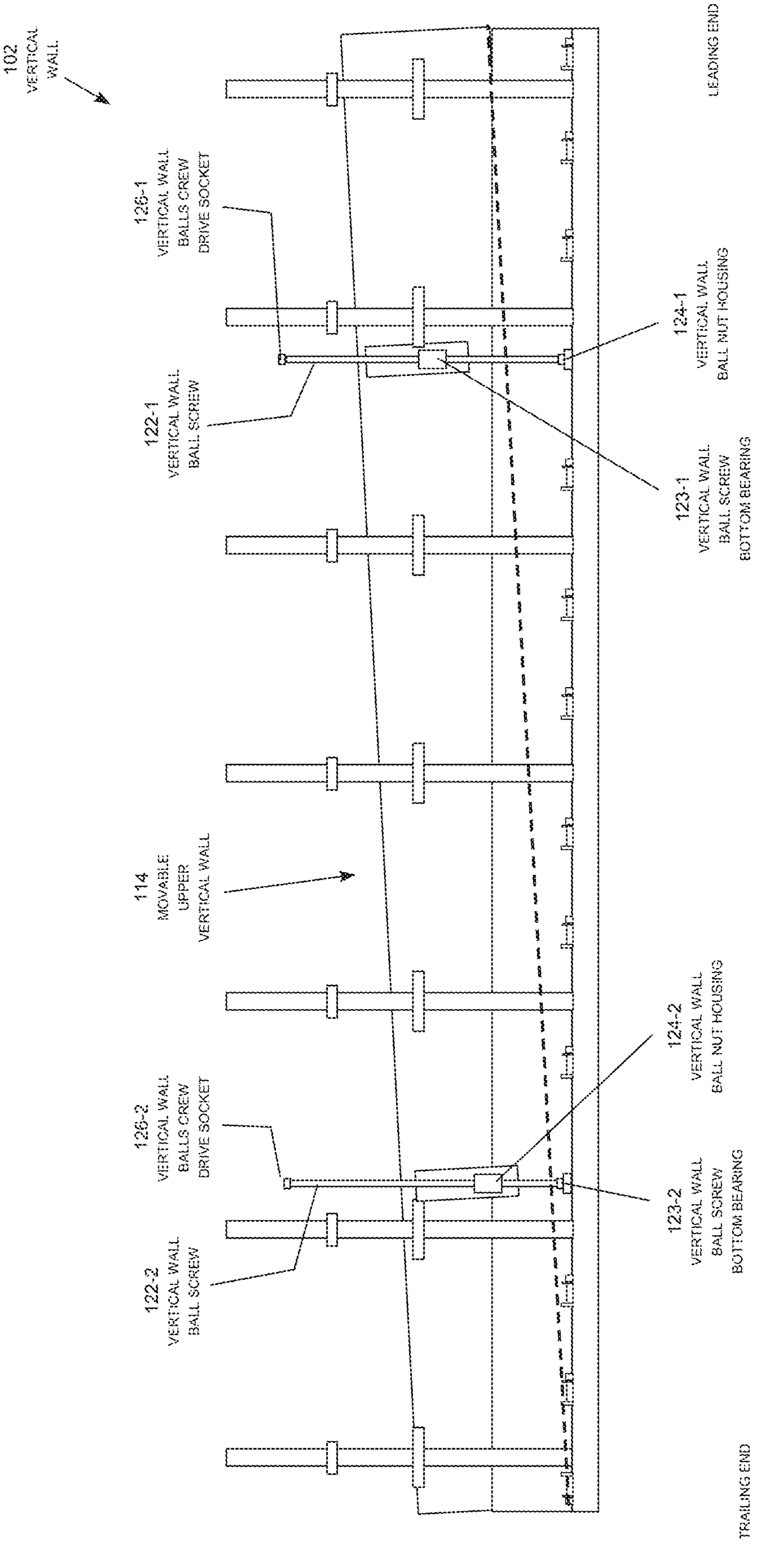
FIG. 12 is a conceptual side elevation view of the vertical wall of the adjustable concrete form in a third position.

FIG. 12 shows the adjustable concrete form 100 with the movable upper vertical wall 114 in its tilted fully-counter-clockwise position. In this particular embodiment, the vertical wall 102 is approximately 5-feet tall at its trailing end (to the left in FIG. 12) and 8-feet tall at its leading end (to the right in FIG. 12) with the movable upper vertical wall 114 in its fully-counter-clockwise position as shown in FIG. 12. The fully-counter-clockwise position of the movable upper vertical wall 114 is reached by lowering one mechanical jack controlling the position of one end this wall to its lower position while raising the other mechanical jack move the other end of the wall to its upper position. In this particular embodiment, the movable upper vertical wall 114 is placed in its fully-counter-clockwise position by rotating the vertical wall ball screw drive socket 126-1 until the vertical wall ball nut housing 124-1 reaches its upper limit, while also rotating the vertical wall ball screw drive socket 126-2 until the vertical wall ball nut housing 124-2 reaches its lower limit.

Figure 13:
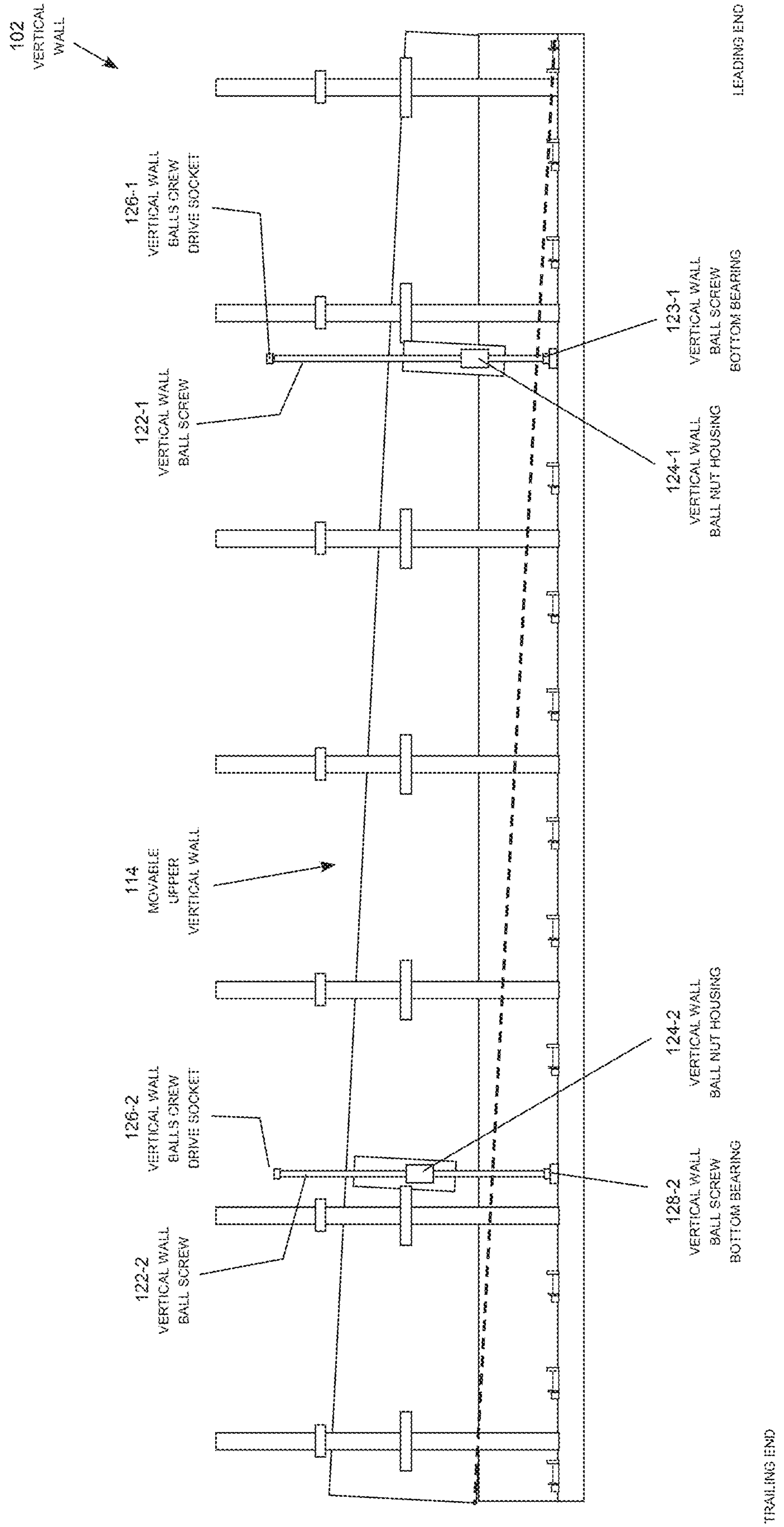
FIG. 13 is a conceptual side elevation view of the vertical wall of the adjustable concrete form in a fourth position.

FIG. 13 shows the adjustable concrete form 100 with the movable upper vertical wall 114 in its tilted fully-clockwise position. In this particular embodiment, the vertical wall 102 is approximately 8-feet tall at its trailing end (to the left in FIG. 13) and 5-feet tall at its leading end (to the right in FIG. 13) with the movable upper vertical wall 114 in its fully-clockwise position as shown in FIG. 13. The fully-clockwise position of the movable upper vertical wall 114 is reached by lowering one mechanical jack controlling the position of one end of this wall to the lower position while raising the other mechanical jack to move the other ends of the wall to its upper position. In this particular embodiment, the movable upper vertical wall 114 is placed in its fully-clockwise position by rotating the vertical wall ball screw drive socket 126-1 until the vertical wall ball nut housing 124-1 reaches its lower limit, while also rotating the vertical wall ball screw drive socket 126-2 unto the vertical wall ball nut housing 124-2 reaches its upper limit, FIGS. 14-17 are conceptual side elevation views of the sloped wall 104 of the adjustable concrete form 100 illustrating the independent tilting and translating of the movable sloped upper wall 140 and the independently movable center channel 142. The movable sloped upper wall 140 and center channel 142 can be placed in any intermediate position between the limits illustrated by FIGS. 14-17.

Figure 14:
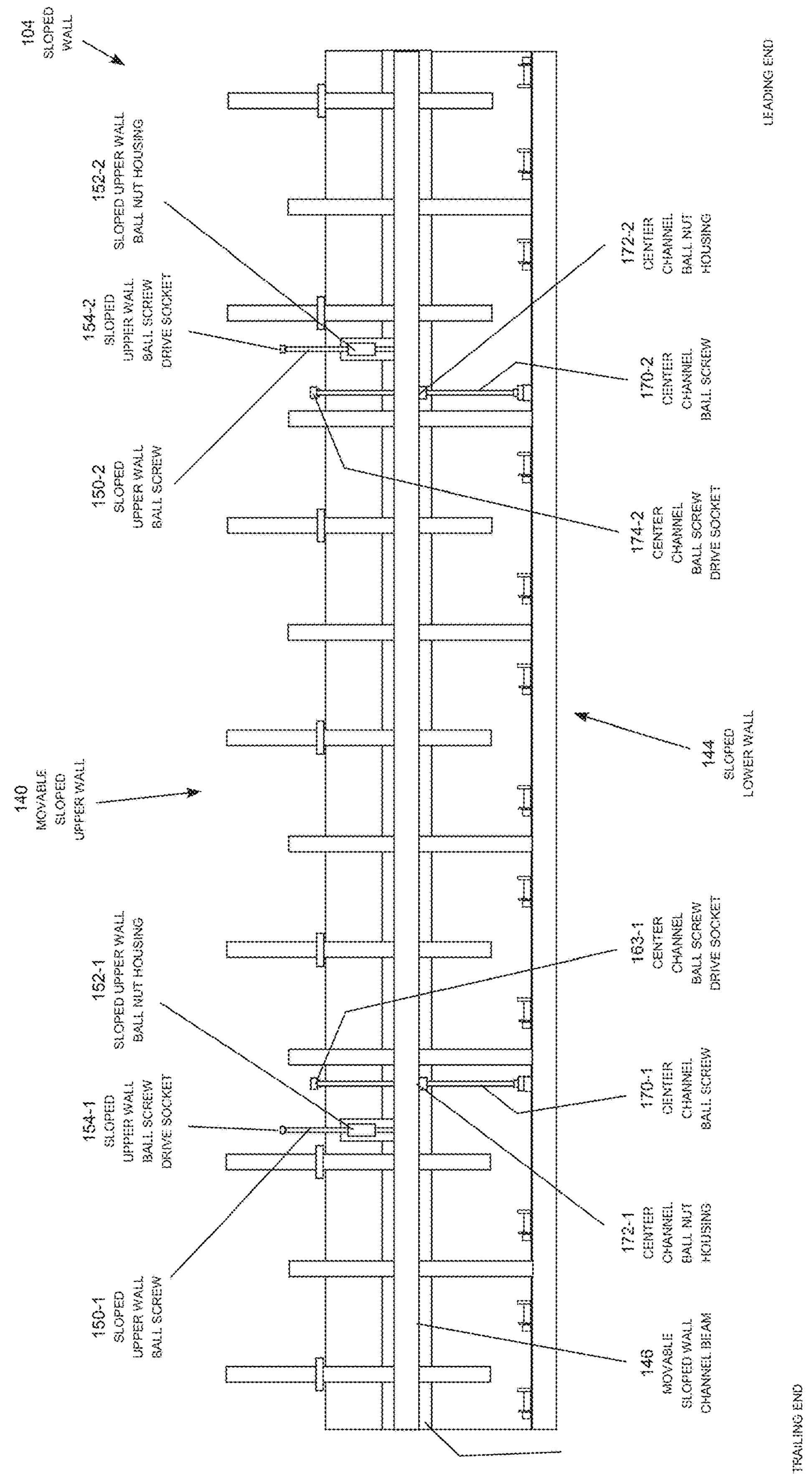
FIG. 14 is a conceptual side elevation view of the sloped wall of the adjustable concrete form in a first position.

FIG. 14 shows the adjustable concrete form 100 with the sloped wall 104 in its upper position. The sloped wall 104 is approximately 30-feet long and approximately 8-feet tall with the movable sloped upper wall 140 and the center channel 142 in their upper positions as shown in FIG. 14. The upper position of the movable sloped upper wall 140 is reached by raising both mechanical jacks controlling the position of these walls to their upper positions. In this particular embodiment, the movable sloped upper wall 140 is placed in its upper position by rotating the sloped upper wall ball screw drive sockets 156-1 and 156-2 until the movable sloped wall ball nut housings 154-1 and 154-2 reach their upper limits. Similarly, the upper position of the center channel 142 is reached by raising both mechanical jacks controlling the position of this channel to their upper positions. In this particular embodiment, the center channel 142 is placed in its upper position by rotating the center channel ball screw drive sockets 176-1 and 176-2 until the center channel ball nut housings 174-1 and 174-2 reach their upper limits.

Figure 15:
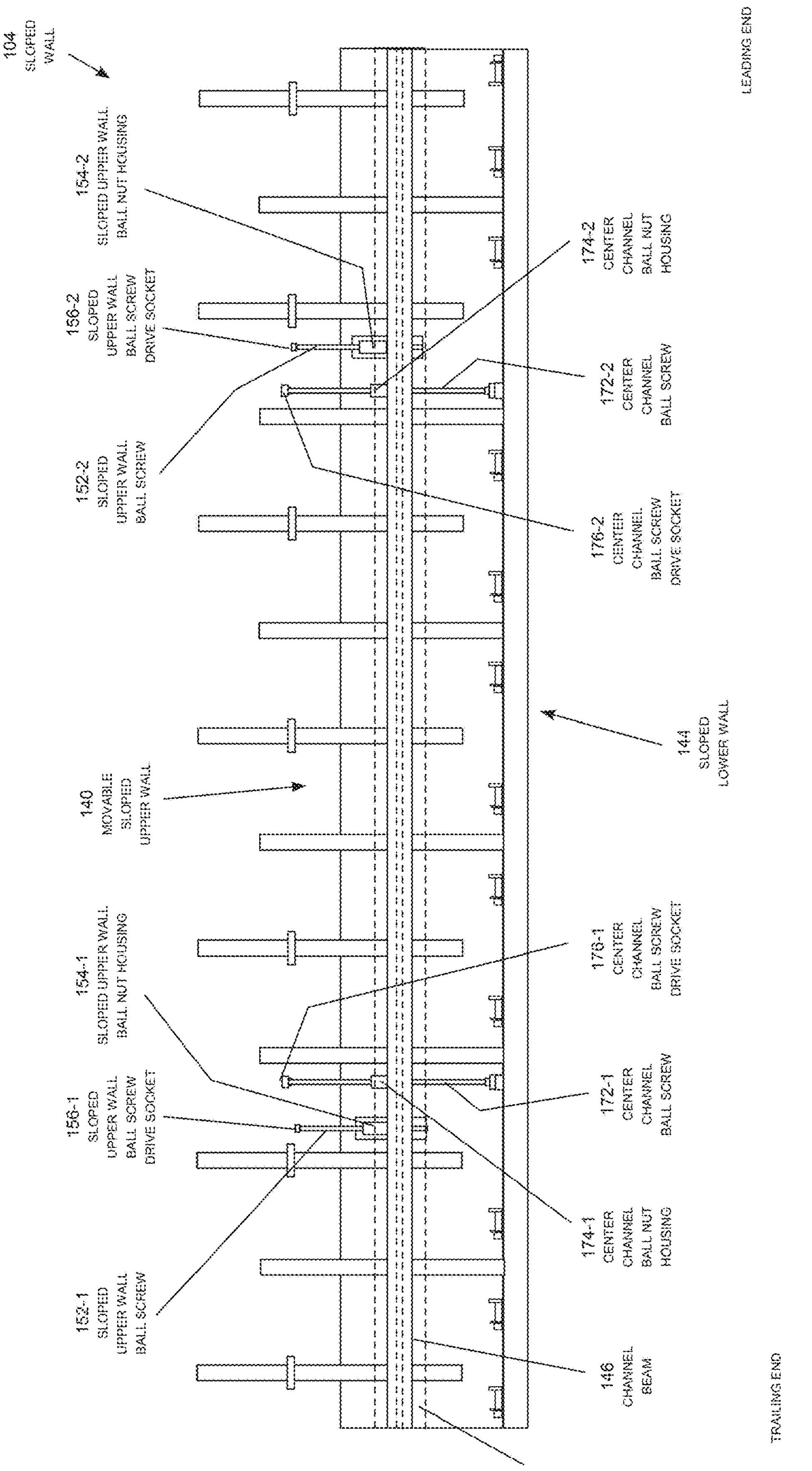
FIG. 15 is a conceptual side elevation view of the sloped wall of the adjustable concrete form in a second position.

FIG. 15 shows the adjustable concrete form 100 with the sloped wall 104 in its lower position. The sloped wall 104 is approximately 5-feet tall with the movable sloped upper wall 140 and the center channel 142 in their lower positions as shown in FIG. 15. The lower position of the movable sloped upper wall 140 is reached by lowering both mechanical jacks controlling the position of these walls to their lower positions. In this particular embodiment, the movable sloped upper wall 140 is placed in its lower position by rotating the sloped upper wall ball screw drive sockets 156-1 and 156-2 until the movable sloped wall ball nut housings 174-1 and 174-2 reach their lower limits. Similarly, the lower position of the center channel 142 is reached by lowering both mechanical jacks controlling the position of this channel to their lower positions. In this particular embodiment, the center channel 142 is placed in its lower position by rotating the center channel ball screw drive sockets 176-1 and 176-2 until the center channel ball nut housings 174-1 and 174-2 reach their lower limits.

Figure 16:
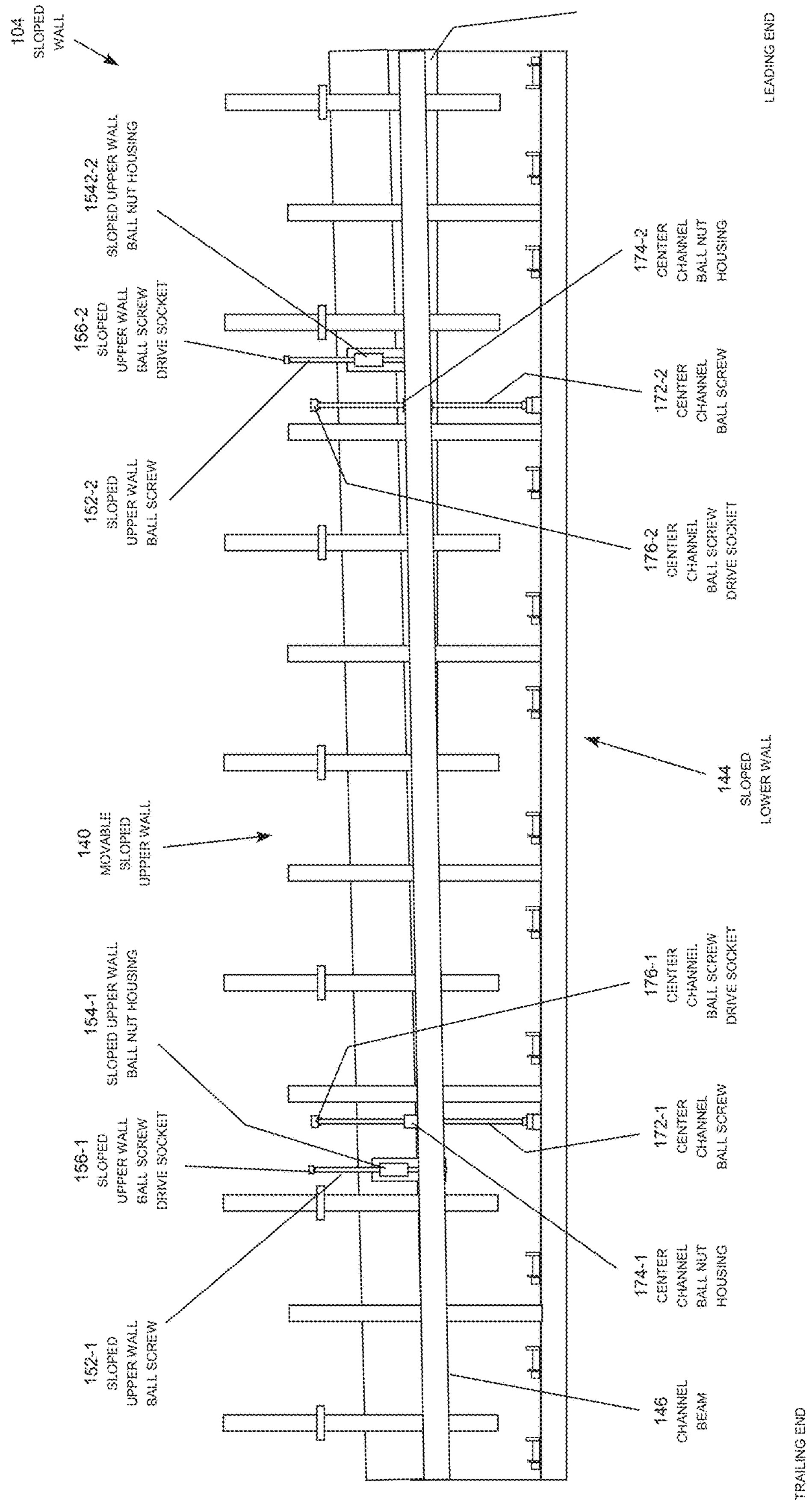
FIG. 16 is a conceptual side elevation view of the sloped wall of the adjustable concrete form in a third position.

FIG. 16 shows the adjustable concrete form 100 with the sloped wall 104 in its fully-counter-clockwise position. The sloped wall 104 is approximately 8-feet tall at its trailing end (to the left in FIG. 16) and 5-feet tall at its leading end (to the right in FIG. 16) with the movable sloped upper wall 140 and the center channel 142 in their fully-counter-clockwise positions as shown in FIG. 16. In this particular embodiment, the movable sloped upper wall 140 is placed in its fully-counter-clockwise position by rotating the sloped upper wall ball screw drive socket 156-1 until the movable sloped wall ball nut housing 154-1 reaches its lower limit, while rotating the sloped upper wall ball screw drive socket 156-2 until the movable sloped wall ball nut housing 154-2 reaches its upper limit. Similarly, the fully-counter-clockwise position of the center channel 142 is reached by raising one of the mechanical jacks controlling the position of one end of this channel to its upper position while lowering the other mechanical jack controlling the other end of the channel to its lower position. In this particular embodiment, the center channel 142 is placed in its fully-counter-clockwise position by rotating the center channel ball screw drive socket 176-1 until the center channel ball nut housing 174-1 reaches its lower limit, while rotating the center channel ball screw drive socket 176-2 until the center channel ball nut housing 174-2 reaches its upper limit.

Figure 17:
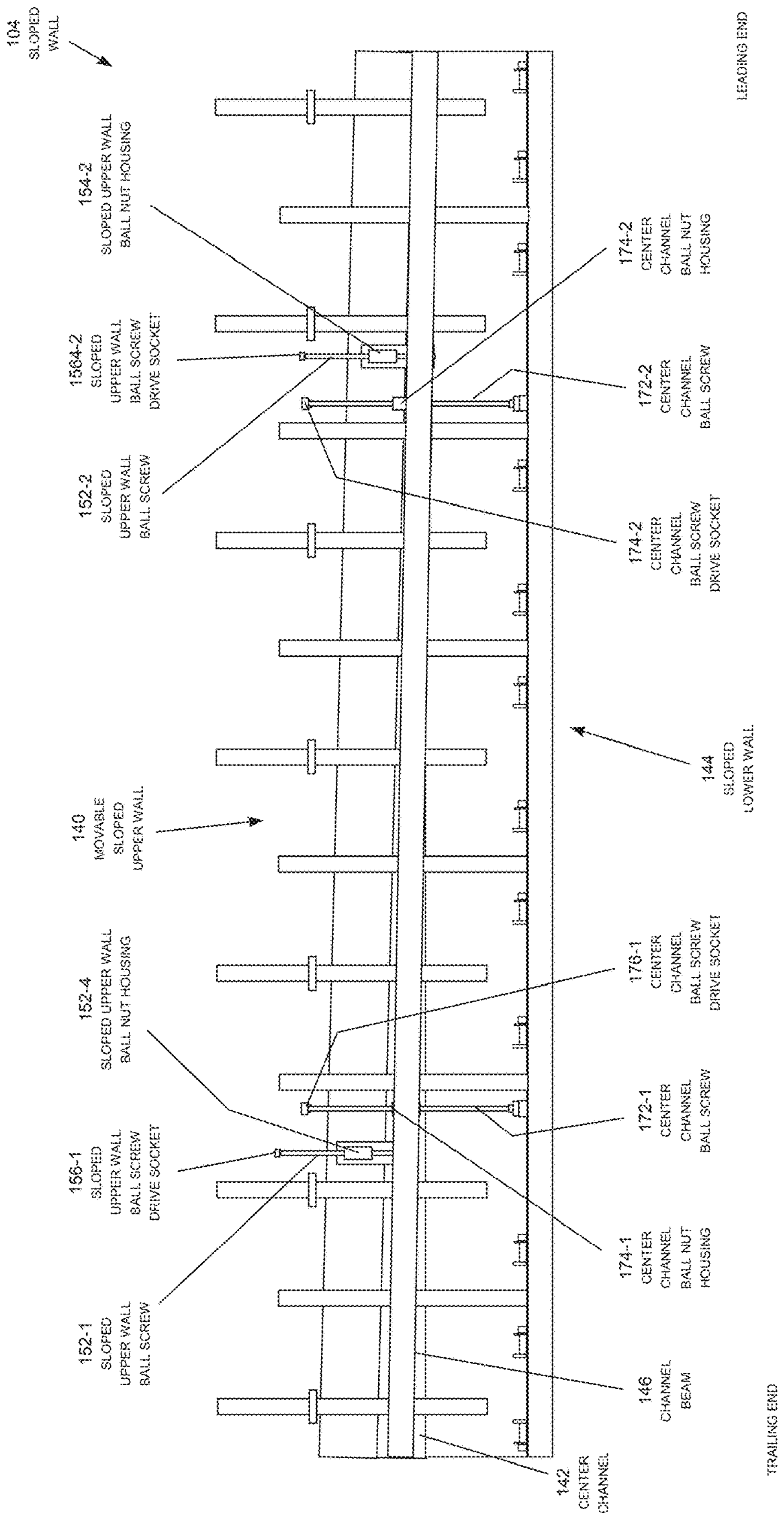
FIG. 17 is a conceptual side elevation view of the sloped wall of the adjustable concrete form in a fourth position.

FIG. 17 shows the adjustable concrete form 100 with the sloped wall 104 in its fully-clockwise position. The sloped wall 104 is approximately 5-feet tall at its trailing end (to the left in FIG. 17) and 5-feet tall at its leading end (to the right in FIG. 17) with the movable sloped upper wall 140 and the center channel 142 in their fully-clockwise positions as shown in FIG. 17. In this particular embodiment, the movable sloped upper wall 140 is placed in its fully-clockwise position by rotating the sloped upper wall ball screw drive socket 156-1 until the movable sloped wall ball nut housing 154-1 reaches its upper limit, while rotating the sloped upper wall ball screw drive socket 156-2 until the movable sloped wall ball nut housing 154-2 reaches its lower limit. Similarly, the fully-clockwise position of the center channel 142 is reached by raising one of the mechanical jacks controlling the position of one end of this channel to its upper position while lowering the other mechanical jack controlling the position of the other end of the channel to its lower position. In this particular embodiment, the center channel 142 is placed in its fully-clockwise position by rotating the center channel ball screw drive socket 176-1 until the center channel ball nut housing 174-1 reaches its upper limit, while rotating the center channel ball screw drive socket 176-2 until the center channel ball nut housing 174-2 reaches its lower limit.

Figure 18:
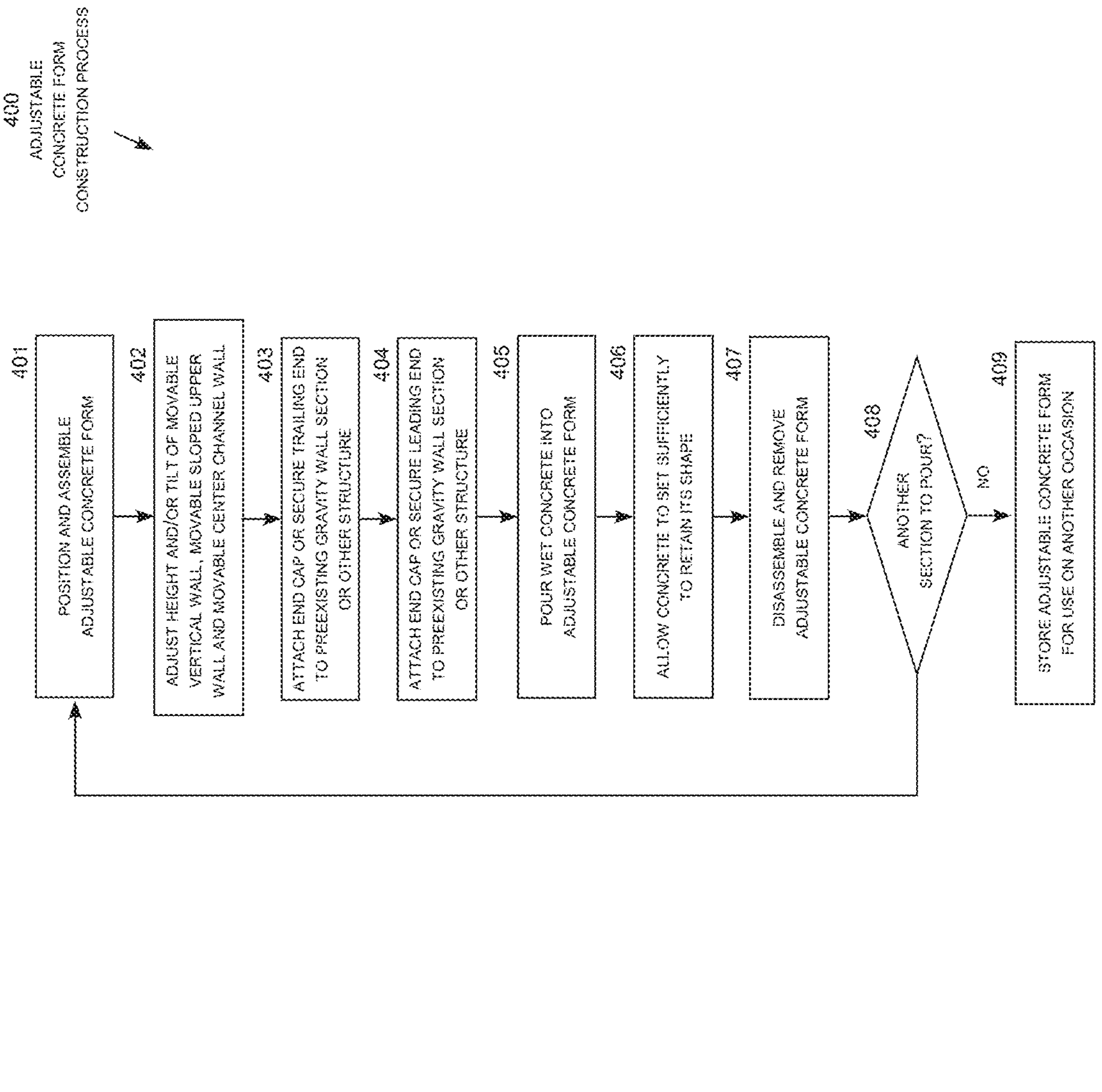
FIG. 18 is a logic flow diagram illustrating an adjustable concrete form construction process.

FIG. 18 is a logic flow diagram illustrating an adjustable concrete form construction process 400. In step 401, construction technicians position and assemble an adjustable concrete form. Step 401 is followed by step 402, in which the construction technicians adjust the height and/or tilt of the movable vertical wall of the vertical, as well as the movable sloped upper wall and the independently movable center channel of the sloped wall, to the desired positions. The wall heights and/or tilts are adjusted through the operation of mechanical jacks built into the walls. The top separation distance between the vertical and sloped walls is adjusted by operation of upper connectors (e.g., tie bars), while the bottom separation distance between the vertical and sloped walls is adjusted by operation of lower connectors (e.g., base straps). Once the adjustable wall is set up into the desired configuration, step 402 is followed by step 403, in which the construction technicians attach an end cap or secure the trailing end of the adjustable construction form to a preexisting gravity wall section or other structure to seal the trailing end of the form. Similarly, step 403 is followed by step 404, in which the construction technicians attach an end cap or secure the leading end of the adjustable construction form to a preexisting gravity wall section or other structure to seal the leading end of the form. Step 404 is followed by step 405, in which the construction technicians pour wet concrete into the adjustable concrete form. Step 405 is followed by step 406, in which the construction technicians wait for the poured concrete to set sufficiently to retain its shape, for example overnight. Step 406 is followed by step 407, in which the construction technicians disassemble and remove the adjustable concrete form. Step 407 is followed by step 408, in which the construction technicians determine whether another section of concrete is to be poured using the adjustable concrete form. If another section of concrete is to be poured, the "yes" branch loops to step 401, in which the adjustable concrete form is used to pour another section of concrete. If another section of concrete is not to be poured, the "no" branch is followed to step 409, in which the adjustable concrete form is stored for use on another occasion.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected" or "coupled" to each other to achieve the desired functionality. Similarly, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

It will be appreciated that layers, features, elements, etc., depicted herein are illustrated with particular dimensions relative to one another, such as structural dimensions or orientations, for example, for purposes of simplicity and ease of understanding and that actual dimensions of the same differ substantially from that illustrated herein, in some embodiments. Moreover, "exemplary," "representative," or "illustrative" may be used to mean "serving as an example, instance, or illustration" and not necessarily as advantageous. As used in this application, "or" is intended to mean an inclusive or rather than an exclusive or. In addition, the words "a" and "an" in this specification and the appended claims are generally be construed to mean "one or more" unless specified otherwise or clear from context to be directed to a singular form. Also, at least one of A and B and/or the like generally means A or B, or both A and B. Furthermore, to the extent that "includes," "having," "has," "with," or variants of these terms are used, the terms are intended to be inclusive in a manner similar to the meaning conventionally ascribed to the term "comprising." Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. Accordingly, the scope of the disclosure should be limited only by the claims appended hereto.

The invention claimed is:

1. An adjustable concrete form, comprising:
   a vertical wall comprising a vertical wall channel, a movable upper vertical wall slidably received in the vertical wall channel, and one or more vertical wall mechanical jacks attached to the vertical wall for positioning the movable vertical wall within the vertical wall channel;
   a sloped wall comprising a center channel, a movable sloped upper wall slidably received in an upper portion of the center channel, a sloped lower wall slidably received in a lower portion of the center channel, one or more sloped upper wall mechanical jacks attached to the sloped upper wall for positioning the sloped upper wall within the upper portion of the center channel, and one or more center channel mechanical jacks attached to the sloped wall for positioning the lower portion of the center channel on the sloped lower wall;
   one or more upper connectors connecting a top portion of the vertical wall an adjustable separation distance from a top portion of the sloped wall;
   wherein the vertical wall, the sloped wall, and the upper connectors are removably attached together for assembling, disassembling, repositioning, and reassembling for reusing the adjustable concrete form to fabricate of multiple concrete sections, and
   one or more lower connectors connecting a bottom portion of the vertical wall an adjustable separation distance from a bottom portion of the sloped wall.

2. The adjustable concrete form of claim 1, further comprising a plurality of vertical wall beams removably supporting the vertical wall.

3. The adjustable concrete form of claim 1, further comprising a channel housing beveled edge to prevent or inhibit wet concrete between the vertical wall and the sloped wall from infiltrating into the vertical wall channel.

4. The adjustable concrete form of claim 1, further comprising:
   a vertical wall base supporting the vertical wall;
   a channel housing seal plate extending from a vertical channel to the vertical wall base to prevent or inhibit wet concrete between the vertical wall and the sloped wall from infiltrating into the vertical wall channel.

5. The adjustable concrete form of claim 1, further comprising:
   a center beam supporting the center channel;
   a plurality of sloped upper wall beams removably supporting the sloped upper wall;
   wherein the center beam defines a plurality of upper wall beam slots;
   wherein each sloped upper wall beam passes through a respective upper wall beam slot allowing the center channel to move independently of the sloped upper wall.

6. The adjustable concrete form of claim 1, wherein the lower connectors comprise fabric straps, further comprising one or more ratchet cleats attached to the adjustable concrete form to tension the one or more fabric straps.

7. The adjustable concrete form of claim 1, wherein:
   each vertical wall mechanical jack comprises a ball screw comprising a ball screw drive socket, a ball screw bottom bearing in communication with the ball screw, a ball nut captured on the ball screw, a ball nut housing attached to the ball nut and the movable vertical wall allowing the ball nut housing to rotate with respect to its respective ball screw to allow the movable vertical wall to tilt in response to rotation of the respective ball screw without binding;
   each sloped upper wall mechanical jack comprises a ball screw comprising a ball screw drive socket, a ball screw bottom bearing in communication with the ball screw, a ball nut captured on the ball screw, a ball nut housing attached to the ball nut and the sloped upper wall allowing the ball nut housing to rotate with respect to its respective ball screw to allow the movable vertical wall to tilt in response to rotation of the respective ball screw without binding;
   each center channel mechanical jack comprises a ball screw comprising a ball screw drive socket, a ball screw bottom bearing in communication with the ball screw, a ball nut captured on the ball screw, a ball nut housing attached to the ball nut and the center channel allowing the ball nut housing to rotate with respect to its respective ball screw allowing the movable center channel to tilt in response to rotation of the respective ball screw without binding.

8. An adjustable concrete form, comprising:
   a vertical wall comprising a vertical wall channel, a movable upper vertical wall slidably received in the vertical wall channel, and one or more vertical wall mechanical jacks attached to the vertical wall for positioning the movable vertical wall within the vertical wall channel;
   a sloped wall comprising a center channel, a movable sloped upper wall slidably received in an upper portion of the center channel, a sloped lower wall slidably received in a lower portion of the center channel, one or more sloped upper wall mechanical jacks attached to the sloped upper wall for positioning the sloped upper wall within the upper portion of the center channel, and one or more center channel mechanical jacks attached to the sloped wall for positioning the lower portion of the center channel on the sloped lower wall;
   one or more upper connectors connecting a top portion of the vertical wall an adjustable separation distance from a top portion of the sloped wall;

wherein the vertical wall, the sloped wall, and the upper connectors are removably attached together for assembling, disassembling, repositioning, and reassembling for reusing the adjustable concrete form to fabricate of multiple concrete sections,
   a center beam supporting the center channel;
   a plurality of sloped lower wall beams removably supporting the sloped lower wall;
   wherein the center beam defines a plurality of lower wall beam slots;
   each sloped lower wall beam passes through a respective lower wall beam slot allowing the center channel to move independently of the sloped lower wall.

9. An adjustable concrete form, comprising:
   a vertical wall comprising a vertical wall channel, a movable upper vertical wall slidably received in the vertical wall channel, and a pair vertical wall mechanical jacks attached to the vertical wall for positioning the movable vertical wall within the vertical wall channel at a desired height or tilt with respect to the vertical wall channel;
   a sloped wall comprising a center channel, a movable sloped upper wall slidably received in an upper portion of the center channel, a sloped lower wall slidably received in a lower portion of the center channel, a pair of sloped upper wall mechanical jacks attached to the sloped upper wall for positioning the sloped upper wall within the upper portion of the center channel at a desired height or tilt with respect to the center channel, and a pair of center channel mechanical jacks attached to the sloped wall for positioning the lower portion of the center channel on the sloped lower wall at a desired height or tilt with respect to the sloped lower wall;

one or more upper connectors connecting a top portion of the vertical wall an adjustable separation distance from a top portion of the sloped wall;

one or more base straps, further comprising one or more ratchet cleats attached to the adjustable concrete form to tension the one or more base straps;

wherein the vertical wall, the sloped wall, and the upper connectors are removably attached together for assembling, disassembling, repositioning, and reassembling for reusing the adjustable concrete form to fabricate of multiple concrete sections.

* * * * *